(12) United States Patent
Ralls et al.

(10) Patent No.: US 11,583,950 B2
(45) Date of Patent: *Feb. 21, 2023

(54) SYSTEM AND METHOD FOR ULTRASONIC ADDITIVE MANUFACTURING

(71) Applicant: Huntington Ingalls Incorporated, Newport News, VA (US)

(72) Inventors: John Walter Ralls, Yorktown, VA (US); Daniel John Hebert, Carrollton, VA (US); Kyle A. Wade, Poquoson, VA (US)

(73) Assignee: Huntington Ingalls Incorporated, Newport News, VA (US)

( * ) Notice: Subject to any disclaimer, the term of this patent is extended or adjusted under 35 U.S.C. 154(b) by 330 days.

This patent is subject to a terminal disclaimer.

(21) Appl. No.: 16/991,432

(22) Filed: Aug. 12, 2020

(65) Prior Publication Data

US 2020/0368843 A1 Nov. 26, 2020

Related U.S. Application Data

(63) Continuation-in-part of application No. 16/421,727, filed on May 24, 2019, now Pat. No. 11,224,935.

(60) Provisional application No. 62/683,793, filed on Jun. 12, 2018.

(51) Int. Cl.
*B23K 37/02* (2006.01)
*B23K 20/10* (2006.01)
*B33Y 30/00* (2015.01)
*B33Y 10/00* (2015.01)

(52) U.S. Cl.
CPC ........ *B23K 20/106* (2013.01); *B23K 37/0217* (2013.01); *B23K 37/0247* (2013.01); *B23K 37/0282* (2013.01); *B33Y 10/00* (2014.12); *B33Y 30/00* (2014.12)

(58) Field of Classification Search
None
See application file for complete search history.

(56) References Cited

U.S. PATENT DOCUMENTS

| | | | |
|---|---|---|---|
| 3,217,957 A | 11/1965 | Jarvie | |
| 4,283,617 A | 8/1981 | Merrick et al. | |
| 4,841,123 A * | 6/1989 | Novak | B23K 37/0217 219/76.1 |
| 4,975,133 A | 12/1990 | Gochermann | |
| 5,227,601 A | 7/1993 | Black | |

(Continued)

*Primary Examiner* — Devang R Patel
(74) *Attorney, Agent, or Firm* — Hunton Andrews Kurth LLP

(57) ABSTRACT

In a method of applying a weld to a target surface, a guide rail arrangement is attached to the target, the guide rail arrangement including at least one guide rail. A weld head carriage having a carriage housing, a rail follower assembly, and a sonotrode is movably mounted to the guide rail arrangement so that the follower assembly engages each guide rail for movement there-along. The weld head carriage is positioned adjacent the target surface, feedstock material is deposited onto the target surface, and the sonotrode is extended to engage the deposited feedstock material and apply a welding force to the feedstock material and the target. Relative movement between the carriage and the guide rail arrangement is initiated and ultrasonic vibrations are conducted into the feedstock material and the target, thereby welding the feedstock material to the target surface.

15 Claims, 26 Drawing Sheets

(56) References Cited

U.S. PATENT DOCUMENTS

| | | | |
|---|---|---|---|
| 5,932,123 A * | 8/1999 | Marhofer | B23K 9/12 |
| | | | 219/130.01 |
| 5,947,364 A | 9/1999 | Tamura et al. | |
| 5,981,906 A | 11/1999 | Parker | |
| 6,953,909 B2 * | 10/2005 | Marhofer | B23K 9/0286 |
| | | | 219/60 R |
| 7,028,882 B2 | 4/2006 | Kislovsky et al. | |
| 7,748,592 B2 | 7/2010 | Koga et al. | |
| 8,310,324 B2 | 11/2012 | Harris et al. | |
| 9,266,198 B1 * | 2/2016 | Snead | B23K 37/0264 |
| 9,321,118 B2 | 4/2016 | Dagenais | |
| 9,358,642 B2 | 6/2016 | Pacchione et al. | |
| 9,446,475 B2 | 9/2016 | Norfolk et al. | |
| 9,776,272 B2 * | 10/2017 | Einav | B23K 9/02 |
| 2002/0019683 A1 | 2/2002 | White et al. | |
| 2010/0213244 A1 * | 8/2010 | Miryekta | B23K 20/1245 |
| | | | 228/2.1 |

* cited by examiner

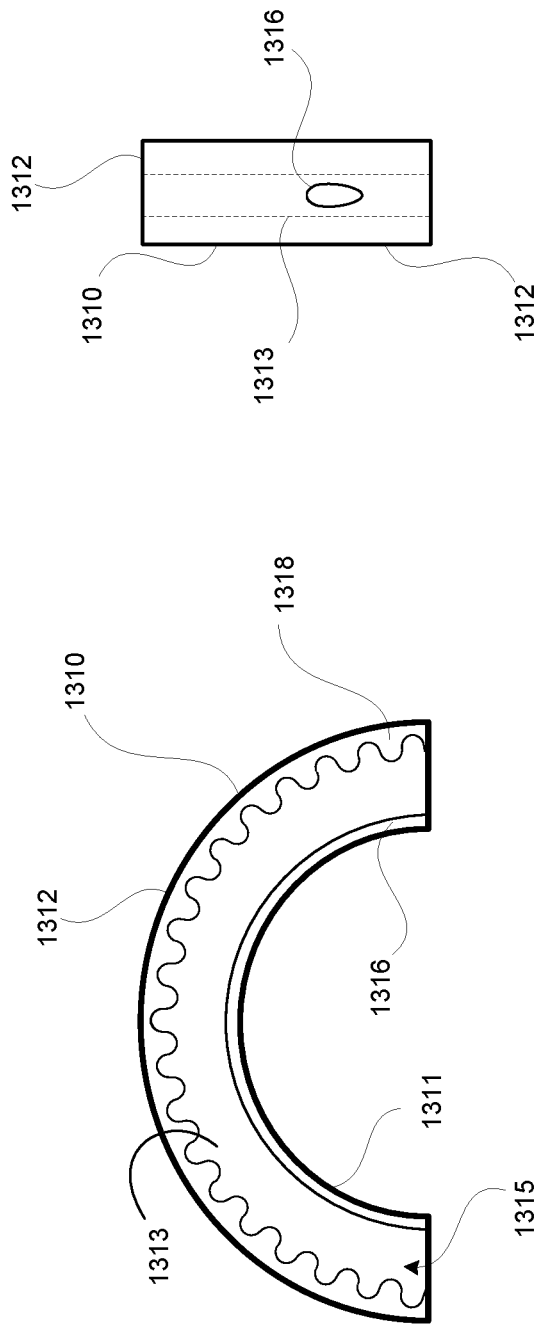

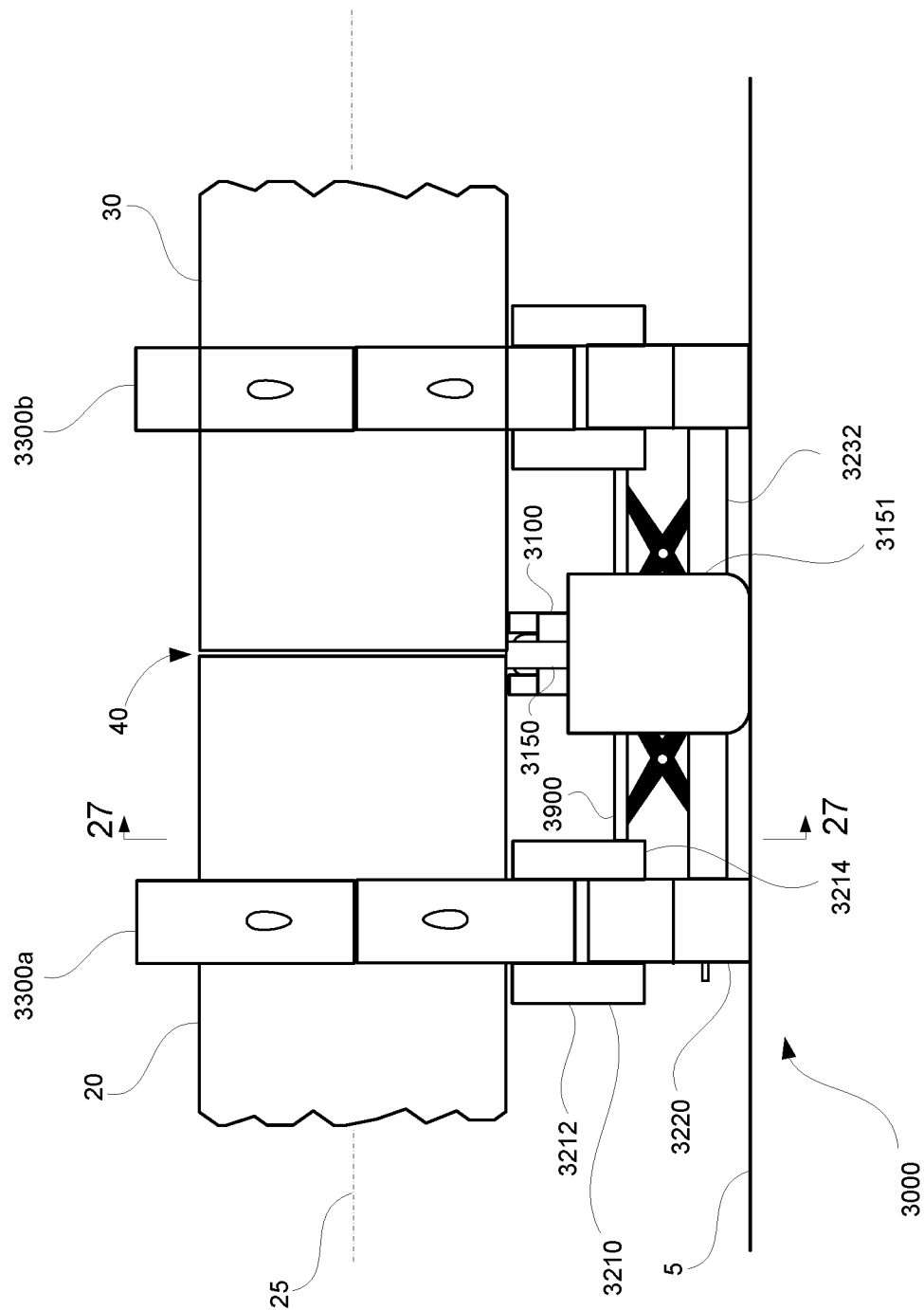

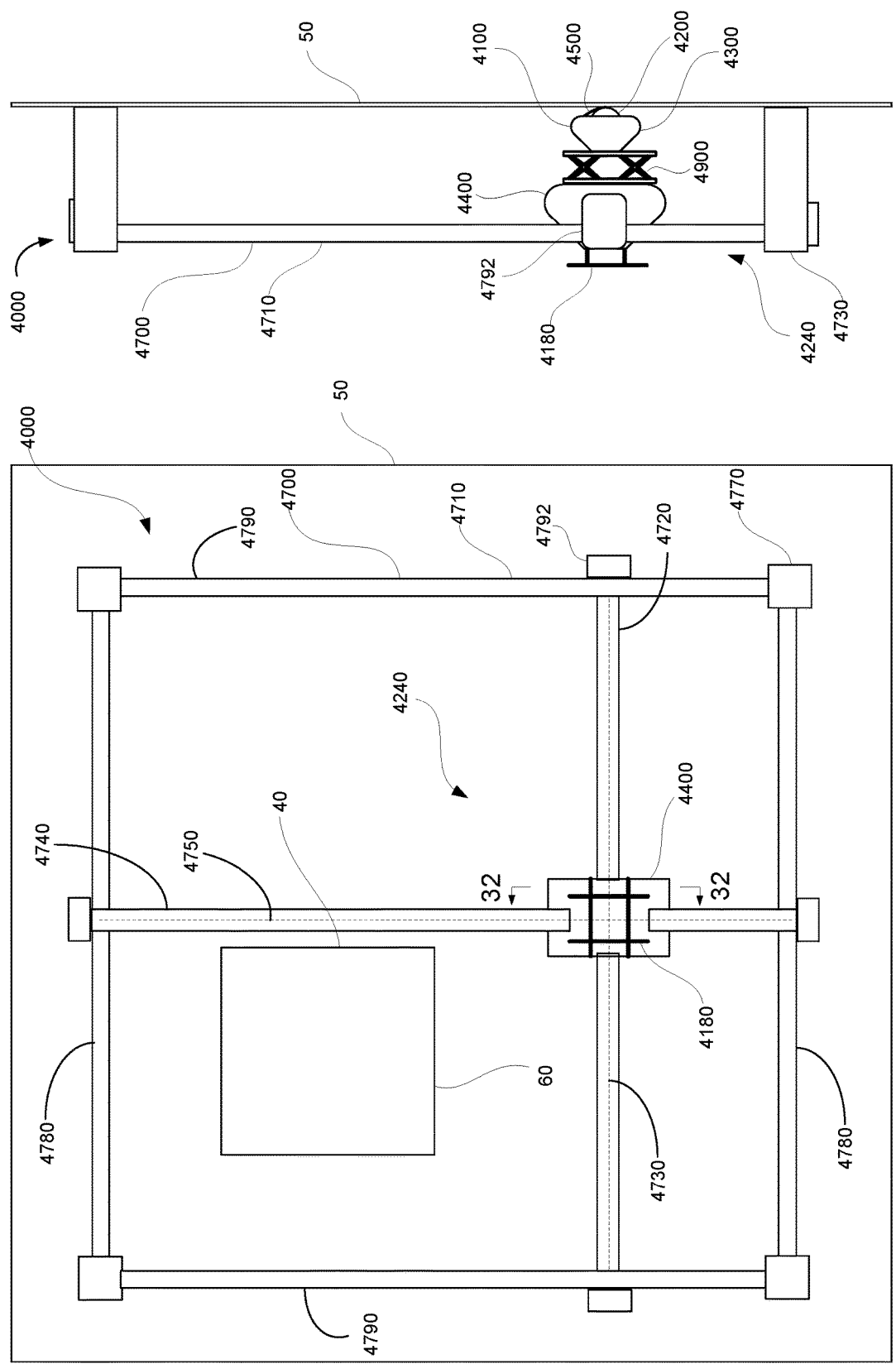

SYSTEM AND METHOD FOR ULTRASONIC ADDITIVE MANUFACTURING

This application is a continuation-in-part of U.S. application Ser. No. 16/421,727, filed May 24, 2019, which claims priority to U.S. Provisional Application No. 62/683,793, filed Jun. 12, 2018, the complete disclosures of both of which are incorporated herein in their entireties.

BACKGROUND OF THE INVENTION

This application relates generally to ultrasonic additive manufacturing (UAM) methods and, more particularly, to the use of ultrasonic AM in a portable device for in-place repair or joining of components.

Additive manufacturing (AM) is the term given to manufacturing processes in which component features are formed through the sequential application of thin, substantially two-dimensional layers. Each layer is made at a specified thickness and many layers are formed in a sequence with the two dimensional layer shape varying from layer to layer to achieve a desired three-dimensional component structure.

In UAM, solid metal objects are formed by ultrasonically welding successive layers of thin metal tape into a three-dimensional weld. The tape layers are held to a substrate under pressure and high-frequency (typically 20,000 hertz) ultrasonic vibrations are applied using a sonotrode to produce a solid-state weld between the tape and the substrate and/or between tape layers. Machining operations (i.e., subtractive manufacturing processes) may be applied during or after UAM operations to provide particular features to the component.

SUMMARY OF THE INVENTION

An illustrative aspect of the invention provides a welding apparatus comprising a guide rail arrangement removably attachable to a welding target. The guide rail arrangement includes at least one guide rail having a lateral channel in which a gear rack is disposed and a plurality of supports attached to each of the at least one guide rail. The supports are removably attachable to a surface of the welding target and are sized and configured for maintaining the at least one guide rail at a uniform distance from the surface. The welding apparatus further comprises a carriage mounting arrangement removably mountable to the guide rail arrangement. The carriage mounting arrangement comprises for each guide rail of the at least one guide rail, a beam support mountable to the guide rail for slidable movement therealong. The carriage mounting arrangement further comprises a first drive mechanism attached to one of the beam supports. The first drive mechanism includes a drive gear configured for engaging the gear rack of a target-mounted guide rail when said one of the beam supports is mounted to the target-mounted guide rail, whereby rotation of the drive gear causes said one of the beam supports to move along said target-mounted guide rail. The carriage mounting arrangement also comprises a first elongate beam mounted to the beam support so that when the guide rail assembly is attached to the target surface and the beam support is mounted to its respective guide rail, the first elongate beam is parallel to the target surface or to a plane tangential to the target surface. The welding apparatus also comprises a welding carriage comprising a carriage housing mounted to the first elongate beam and having an ultrasonic weld head disposed therein. The weld head comprises a sonotrode extending toward the target surface when the welding apparatus is in a welding configuration in which the guide rail arrangement is attached to the target surface and the carriage mounting arrangement is mounted to the guide rail arrangement. The sonotrode is operable to conduct ultrasonic vibrations into and through a layer of feedstock material deposited on the target surface to weld the feedstock material to the target surface.

Another illustrative aspect of the invention provides a method of applying a weld to a welding target. The method comprises attaching a guide rail arrangement to the welding target, the guide rail arrangement including at least one guide rail. The method further comprises movably mounting to the guide rail arrangement, a weld head carriage comprising a carriage housing, a rail follower assembly, and an ultrasonic weld head comprising a sonotrode. The rail follower assembly is placed in engagement with each of the at least one guide rail for movement there-along. The method still further comprises positioning the weld head carriage at a starting position adjacent a target surface of the welding target, depositing feedstock material onto the target surface, and extending at least a portion of the weld head carriage toward the target surface so that the sonotrode engages the deposited feedstock material, thereby applying a normal welding force to the deposited feedstock material and the welding target. The method also comprises initiating relative movement between the weld head carriage and the guide rail arrangement and conducting ultrasonic vibrations into the deposited feedstock material and the welding target, thereby welding the deposited feedstock material to the target surface and adding a welded feedstock layer to the welding target.

BRIEF DESCRIPTION OF THE DRAWINGS

The invention can be more fully understood by reading the following detailed description together with the accompanying drawings, in which like reference indicators are used to designate like elements, and in which:

FIG. 14 is a front view of an arcuate guide member according to an embodiment of the invention;

FIG. 15 is a side view of the arcuate guide member of FIG. 14;

FIG. 25 is a side view of the pipe sections and welding apparatus of FIG. 24;

FIG. 30 is a top view of a welding apparatus according to an embodiment of the invention attached to a planar welding target;

FIG. 31 is a side view of the welding apparatus and target of FIG. 30;

DETAILED DESCRIPTION OF THE INVENTION

While the invention will be described in connection with particular embodiments and manufacturing environments, it will be understood that the invention is not limited to these embodiments and environments. On the contrary, it is contemplated that various alternatives, modifications and equivalents are included within the spirit and scope of the invention as described.

The present invention provides methods and apparatus for joining or repairing components using a portable welding assembly that includes a material deposition apparatus and a sonotrode or similar energy input device. In general, the methods of the invention allow the use of UAM in operations in which a desired relative motion is established and maintained between the material deposition and welding apparatus and the target component(s) being assembled or repaired. The relative motion may be an orbital rotation (e.g., for repairing or joining pipe sections) or may be translational (e.g., parallel to, orthogonal to, or otherwise angled relative to a surface of the target component(s)). The relative motion may be established by holding the target component or components fixed and moving the material deposition and welding apparatus (e.g., rotationally around an axis or translationally along the surface of the target component(s). Alternatively, the material deposition and welding apparatus may be fixed and the target component(s) translated or revolved.

Accordingly, in some embodiments, the welding assembly is housed in a carriage configured to move along a guided track system (orbital or planar) or to be moved within a planar framework, the track or framework being temporarily or permanently attached to the welding target. In other embodiments, the welding assembly is part of an assembly configured to grasp and hold the component(s) in engagement with the welding assembly and to translate or rotate the component(s) relative to the welding assembly.

Illustrative embodiments of the invention are described in more detail in the following paragraphs.

Figure 2:
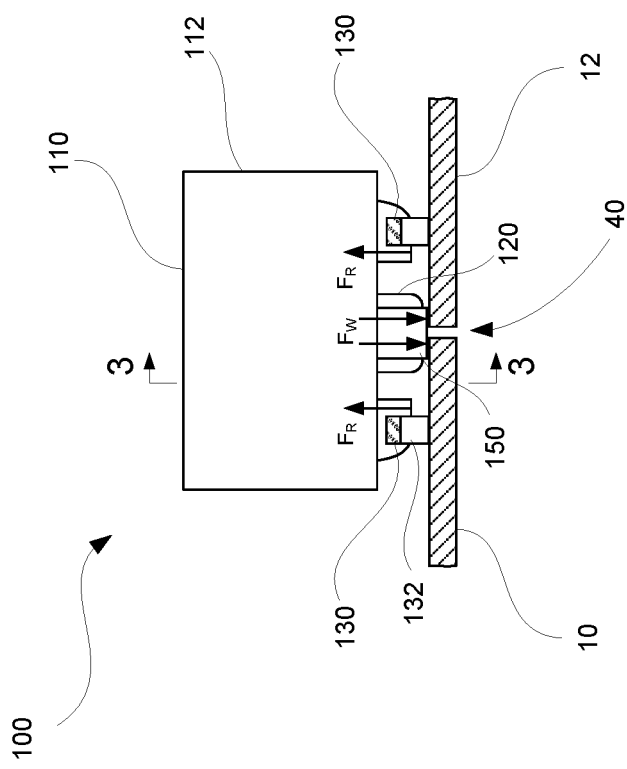
FIG. 2 is a front view of the welding apparatus of FIG. 1.
Figure 1:
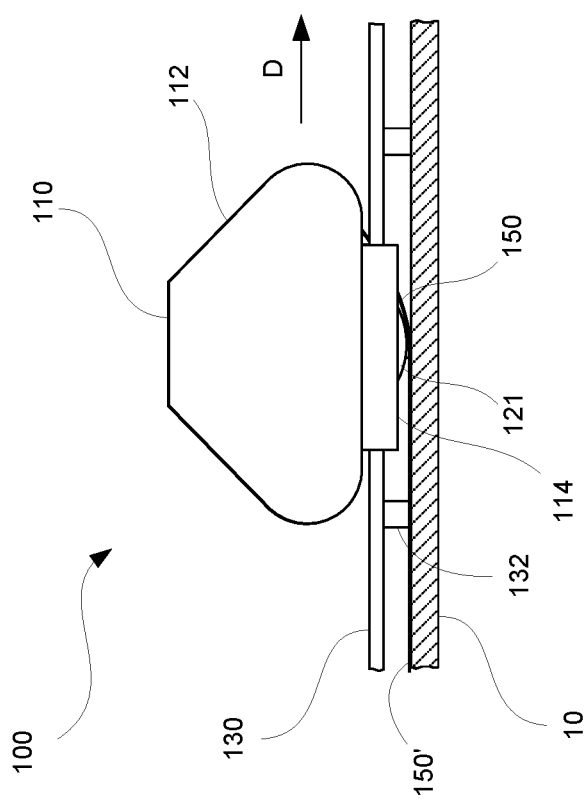
FIG. 1 is a side view of a welding apparatus according to an embodiment of the invention.
Figure 3:
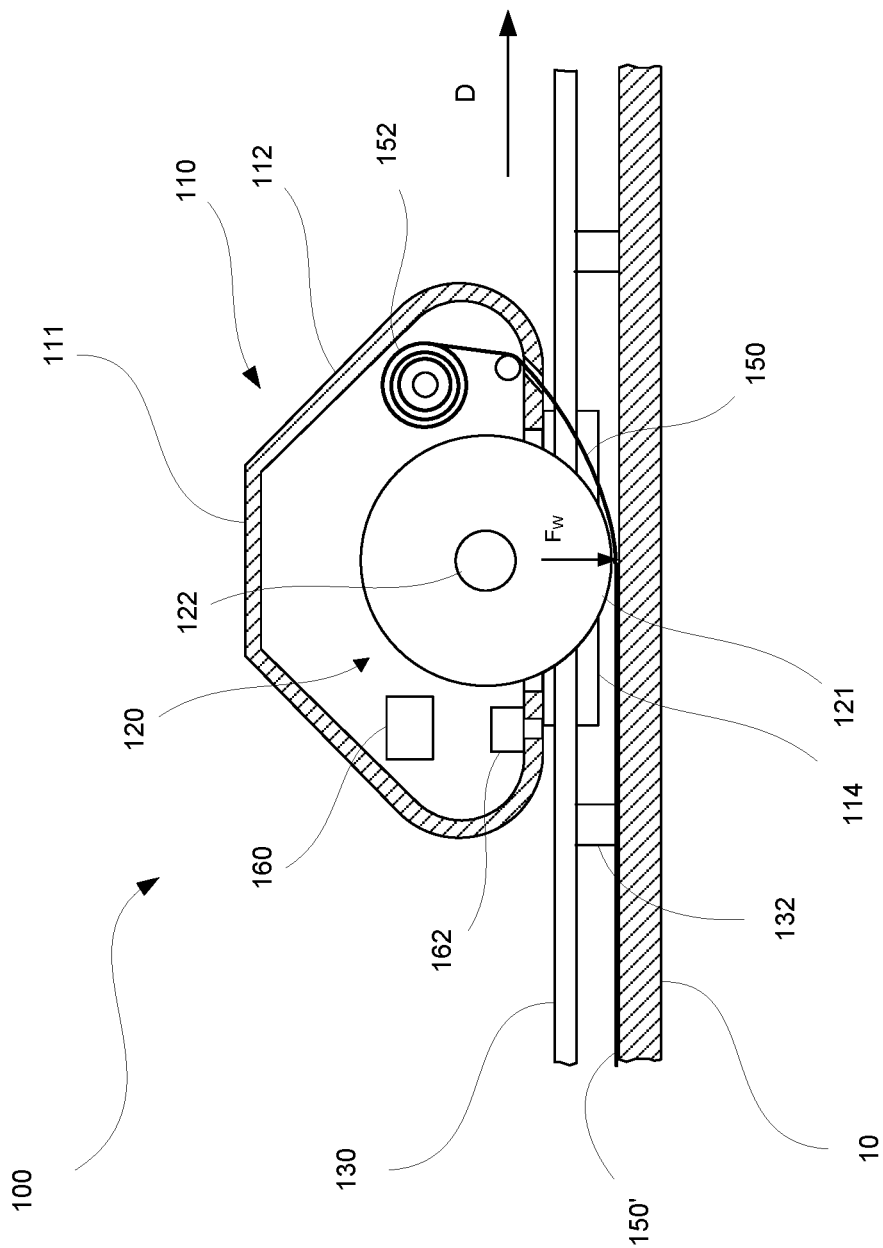
FIG. 3 is a section view of the welding apparatus of FIG. 1.

FIGS. 1-3 depict a UAM apparatus 100 according to an embodiment of the invention. The UAM apparatus 100 is usable for ultrasonic, in-situ welding for repair or construction of a fixed structure (welding target). In the illustrative application of FIG. 1-3, the structure consists of two plates 10, 12 which are to be welded together along a joint line 40. (It will be understood that the structure could also be a single plate with two portions 10, 12 separated by a crack or flaw 40 requiring repair.) The material of the welding target structure (substrate material) may be any metallic material that can be ultrasonically welded. Typical substrate materials would include both ferrous and non-ferrous alloys such as steel, stainless steel alloys, aluminum, copper-based alloys, nickel-based alloys, and other families of alloys. The UAM apparatus 100 comprises a material deposition and welding carriage 110 and a pair of parallel guide rails 130. Each guide rail 130 may be a continuous rail member or may be a plurality of rails segments joined together. In some embodiments, the guide rails 130 may be flexible in order to allow them to follow the contour of a non-planar welding target surface. The guide rails 130 are each supported by a plurality of rail supports 132 which may be temporarily or permanently attached to the structure to be welded. The attachment mechanism need only be sufficient to counter the forces applied to the structure during the welding operation. Suitable mechanisms may include, without limitation, welding, reversible or permanent chemical or thermal bonding, hydraulics, mechanical fasteners (e.g., screws, bolts, clamps, etc.), and magnets. The supports 132 are mounted so that the guide rails 130 are positioned on opposite sides of a line along which the structure is to be welded. In the illustrated example, the rails 132 are mounted along opposite sides of the joint line 40.

While the illustrated embodiment shows a guide rail arrangement having two rails, it will be understood that some embodiments of the invention may use only a single rail (monorail) arrangement. Other embodiments could make use of guide rail arrangements having more than two rails.

While the illustrated example of this embodiment shows the guide rails 130 mounted to a planar surface, they may also be mounted to curved surfaces. For example, the guide rails 130 could be mounted to the outside of a pipe on a line parallel to the pipe centerline.

With reference, in particular, to FIG. 3, the material deposition and welding carriage 110 comprises a carriage housing 112 in which is disposed a weld head 120 comprising a sonotrode 121 and a reel or other source 152 of weldable feedstock 150. The weldable feedstock 150 will typically be in the form of a thin tape that can be drawn from the source 152 and will typically be of a similar metal alloy to the substrate(s) to which it is to be applied. Accordingly, typical feedstock materials include a stainless steel alloys, aluminum alloys, copper-based alloys, nickel-based alloys, and other non-ferrous and ferrous alloys capable of being ultrasonically welded. While the feedstock material is typically similar to the substrate material, dissimilar feedstock metals may also be used for some applications. The carriage housing 112 is mounted to a rail follower assembly in the form of an undercarriage 114 configured to engage the guide rails 130. The undercarriage 114 is further configured so that the carriage 110 is movable along the guide rails 130 and so that it provides a reactive retaining force $F_R$ that holds the undercarriage 112 in engagement with the guide rails 130 in response to the application of a welding force $F_W$ to the structure being welded. In some embodiments, the guide rails 130 may be configured to provide a lower surface that can be engaged by the undercarriage 114 for transmission of the reactive retaining force $F_R$. The undercarriage 114 may include wheels or bearings configured to facilitate the motion of the carriage 110 along the rails 130.

The carriage 110 is configured so that as it moves along the guide rails 130 in the direction D, feedstock 150 is drawn from the feedstock source 152 to pass between the sonotrode 121 and the surface of the structure to be welded. The weld head 120 is mounted so as to allow application of the welding force $F_W$ to the feedstock 150 and the structure surface. In some embodiments and applications, the weight of the device may provide a sufficient force. In other embodiments, internal or external electrical, mechanical or electromechanical mechanisms can be used to apply or contribute to the welding force $F_W$. A simple example of an internal mechanical mechanism would be a screw mounted to the carriage body 112 that turns to provide downward force on the weld head 120 and the sonotrode 121.

At the same time the welding force $F_W$ is being applied to the feedstock 150, the sonotrode transducer 122 is energized to produce high frequency vibration to weld the feedstock 150 to the structure (in this case, to the surfaces of the two plates 10, 12). In the illustrated example, the welded feedstock layer 150' bridges the joint line 40 and serves as a first layer of an ultrasonic weld to permanently join the two plates 10, 12. It will be understood that after application of this first layer of welded feedstock 150', the carriage 110 may be returned to its starting point to apply a subsequent layer 150'. The process may be repeated as many times as necessary to produce the desired weld.

The material deposition and welding carriage 110 may also comprise an on-board data processor 160 in communication with the sonotrode transducer 122 and feedstock dispensing mechanism. The processor 160 may also be in communication with external processors or user input devices. In some embodiments, this may be by wireless connection via a network. The processor 160 may also be in communication with an internal or external power source connected to the sonotrode transducer 122. In alternative embodiments, control of the material deposition and welding carriage 110 may be accomplished via other means such as from an alternate location, via wireless controls (e.g., from an alternate location) or via some other local device able to communicate with the carriage 110.

The apparatus 122 may also include a sensor package 162 mounted to the carriage housing 112. The sensor package 162 may be in communication with the data processor 160 and could include, for example, optical, laser, thermal or other sensors configured and positioned to capture data on the applied feedstock 150'. The captured data may be analyzed to assess the integrity of the welded layer 150'.

Figure 5:
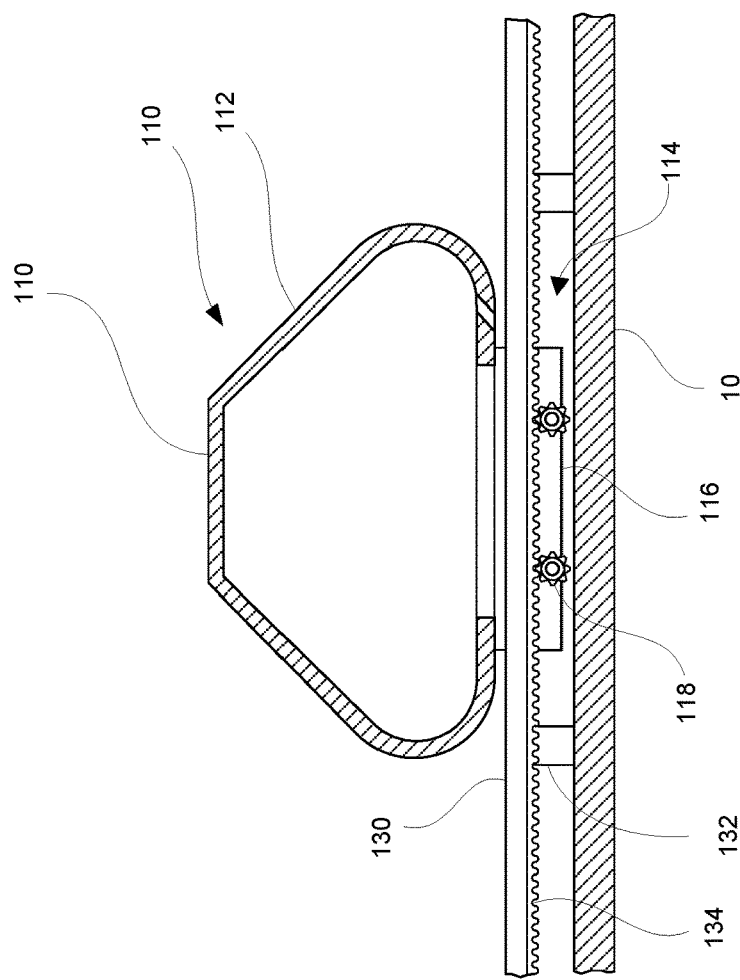
FIG. 5 is a section view of the welding apparatus of FIG. 4 with internal features removed for simplicity.
Figure 4:
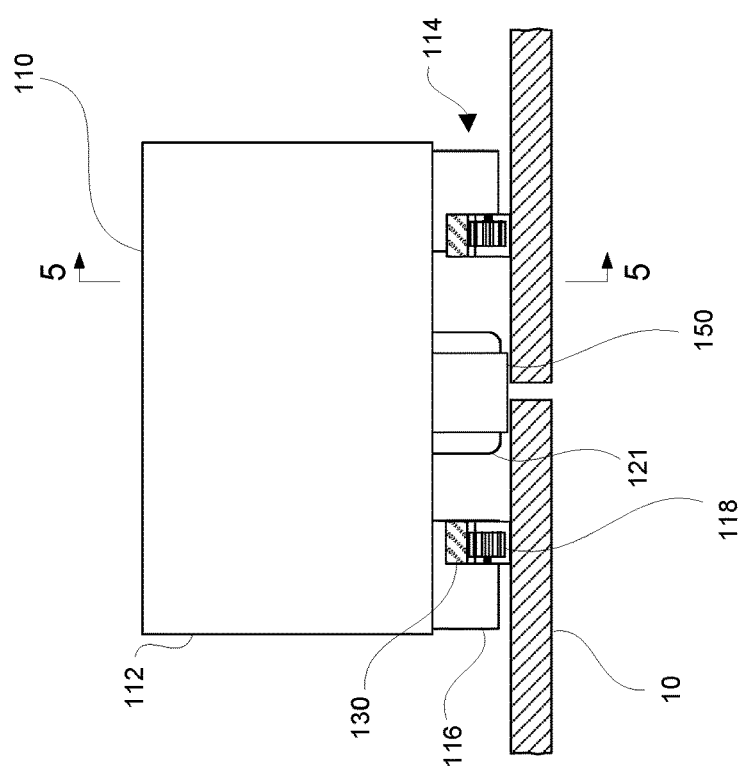
FIG. 4 is a front view of the welding apparatus according to an embodiment of the invention.
Figure 6:
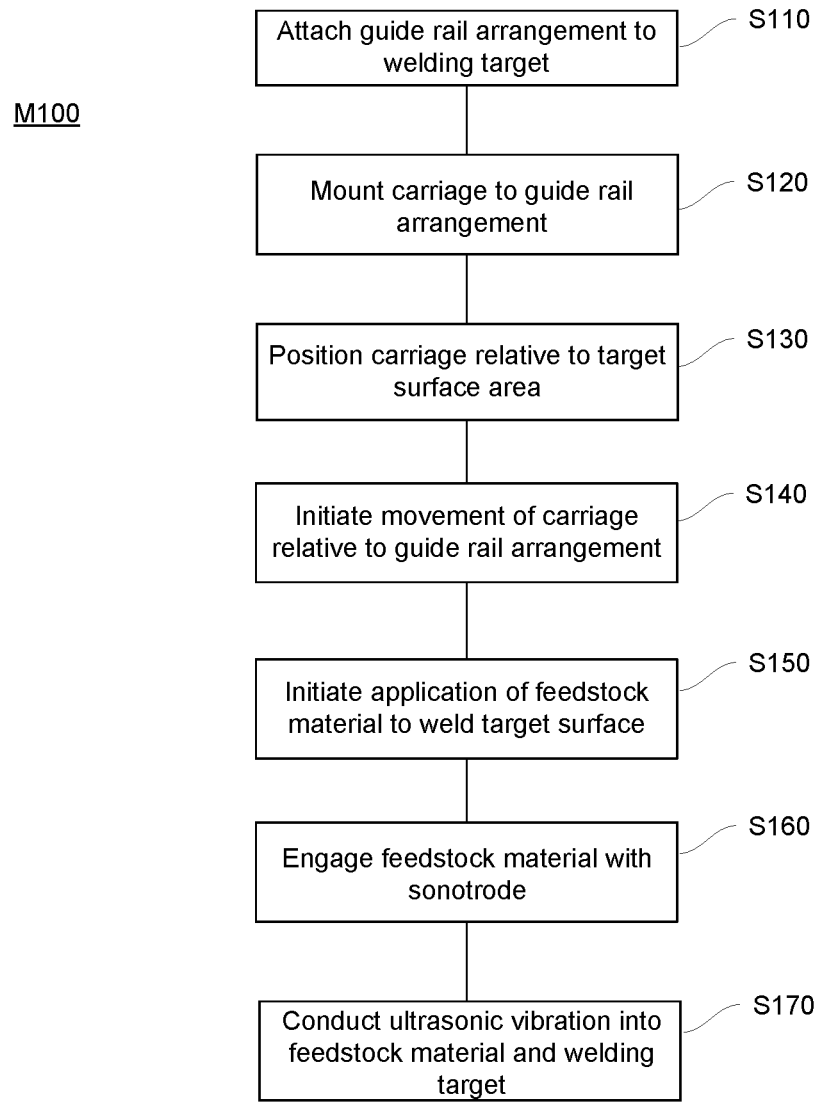
FIG. 6 is a flow diagram of a method of forming a weld according to an embodiment of the invention.

In favored embodiments of the invention the deposition and welding of feedstock material is coincident with movement of the weld head carriage relative to the welding target area of the target structure. In some embodiments, this movement is provided and controlled manually by a user of the apparatus. In other embodiments, the carriage may be self-propelled or propelled by a drive system incorporated into the guide rail arrangement. FIGS. 4 and 5 illustrate a simple variation of the previously described UAM apparatus 100 in which the undercarriage 114 of the carriage 110 includes a drive mechanism. The drive mechanism in this case is a plurality of gears 118 driven by one or more motors (not shown) within a motor housing 116. The gears 118 are configured to engage a rack 134 attached to the underside of each rail 130. Revolution of the gears 118 causes the carriage 110 to be propelled along the rails 130. Any suitable self-propulsion mechanism may be used and may be controlled remotely or by the on-board processor 160. Alternatively, a manual drive mechanism may be operatively connected to the drive mechanism With reference to FIG. 6, a generalized method of applying a weld using the UAM apparatus 100 or apparatus according to other embodiments of the invention includes attaching the guide rail arrangement to the welding target at S110. The welding target may be a single metal object to an area of which a weld is to be applied or the welding target may be a plurality of objects to be joined together. In some applications, the welding target may be permanently affixed in a structural environment. In other applications, the welding target may itself be movable for placement in a work fixture. Depending on the application, the guide rail arrangement may be permanently or temporarily attached to the surface of the target object (e.g., by welding, bonding, or magnetically adhering) surrounding or adjacent a target area on the surface of the welding target. In some applications, the rail or rails of the guide rail arrangement may be attached in separate pieces and joined in place along with their supports.

At S120, the weld head carriage is mounted to the guide rail arrangement. In embodiments where the welding target is immobile, this may include mounting the rail follower assembly of a portable, mobile carriage unit to the rails of the guide rail arrangement. In this scenario, the rails remain stationary along with the welding target and the relative movement of the carriage is established by actual movement of the carriage within the surrounding environment. As will be discussed in more detail below, however, there are some embodiments of the invention in which the weld head carriage is immovably attached to a work fixture and the welding target is movably supported by the work fixture. In these embodiments, the action of mounting the carriage is accomplished by positioning the welding target within the fixture so that the rail follower assembly of the carriage can be mounted to the rails. Motion of the carriage relative to the rails can then be established by the movement of the welding target and the rails within the surrounding environment while the carriage remains motionless.

At S130, the carriage is positioned at a starting position relative to the target area of the target object surface to which a weld is to be applied. At S140 motion of the carriage relative to the rail or rails of the guide rail arrangement is initiated by causing the carriage to move or by causing the weld target and the rails to move. Simultaneously with or shortly after initiation of relative movement, feedstock material from the feedstock source of the carriage is applied to the target are of the surface at S150 and the sonotrode engages the feedstock at S160, thereby applying a welding force $F_W$ to the feedstock material and the surface of the welding target. At S170, the sonotrode is activated to conduct ultrasonic vibrations into the feedstock material and the welding target, thereby welding the feedstock material to the welding target and forming a weld layer. Once the carriage reaches the end of the target area, the sonotrode may be deactivated and disengaged, feedstock application/deposition may be halted, and movement of the carriage halted.

It is contemplated that the feedstock material used in the present invention may provide only a very thin layer that, by itself, would not form a robust weld. It is therefore an objective of the present invention to repeat the actions of the above described method to build a robust, multi-layer weld. Accordingly, the carriage may be repositioned at the starting position and actions S140, S150, S160, and S170 repeated to apply another weld layer to the target object. The actions may be repeated any number of times to build up a desired weld as in typical UAM processes. Additional machining or other processing techniques can then be applied.

In some applications (e.g., joining pipe sections), the guide rails may form a continuous circuit around a circumference of the target object. In such applications, there may be no need to halt material deposition and welding actions or to reposition the carriage for a second weld layer. Instead, the carriage may simply be allowed to continue circumferential movement around the target object, with each orbit providing a new weld layer to the target area.

Figure 7:
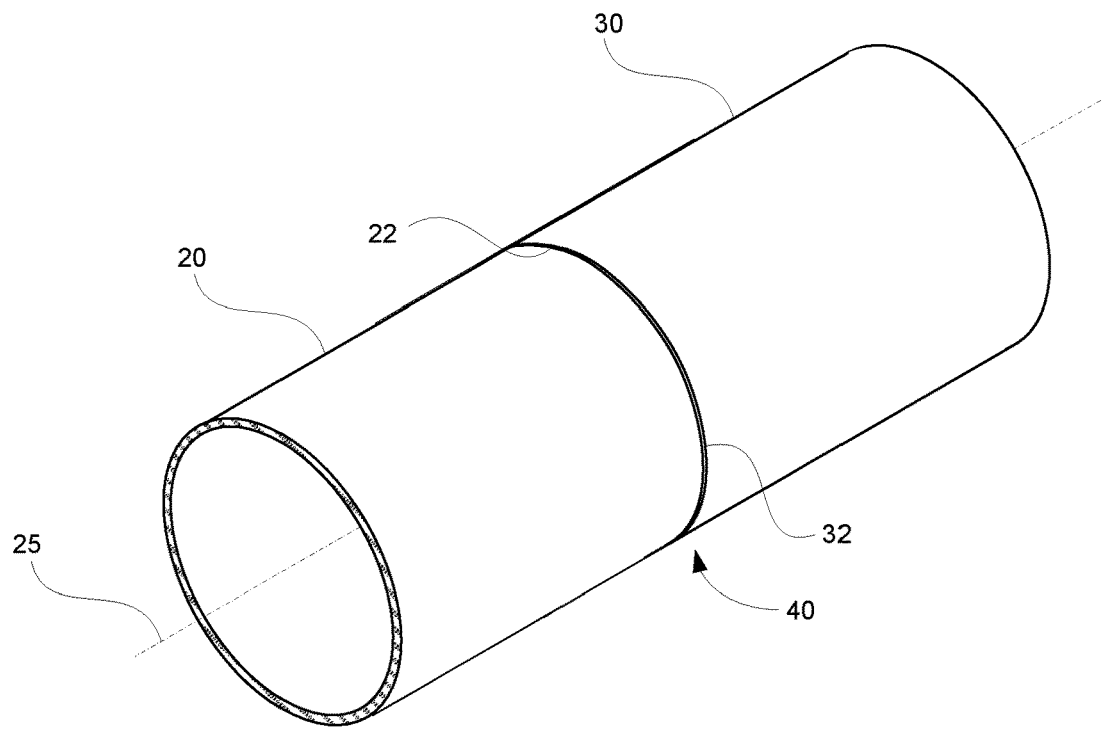
FIG. 7 is a sectioned perspective view of two pipe sections to be joined using a UAM system according to the invention.
Figure 8:
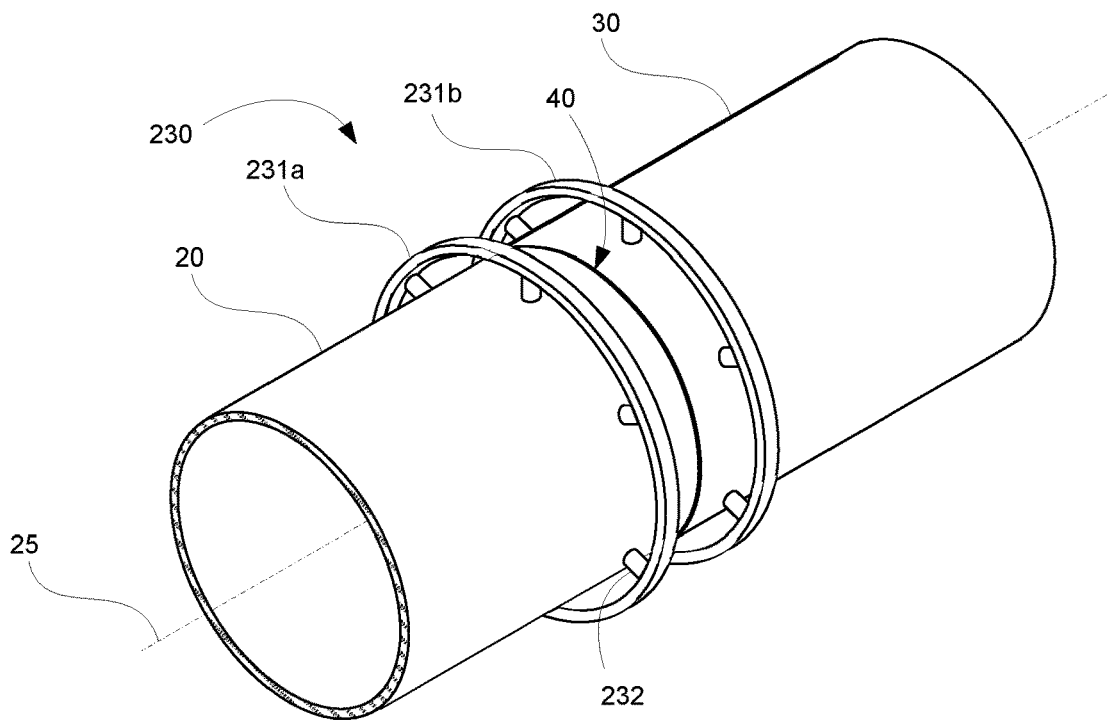
FIG. 8 is a perspective view of the pipe sections of FIG. 7 and the guide rails of a welding apparatus according to an embodiment of the invention.

The present invention may be of particular value in welding pipe or other cylindrical structures. FIG. 7 illustrates an exemplary scenario in which two pipe sections 20, 30 having a common longitudinal center axis 25 are to be welded together. As shown, the free end 22 of the first pipe section 20 and the free end 32 of the second pipe 30 are in contact with one another (or are closely adjacent) at a joint interface 40.

FIGS. 8-11 illustrate an orbital UAM system according to an embodiment of the invention that can be used for in-situ welding of the two pipe sections 20, 30. This system takes the form of a welding apparatus 200 that comprises a mobile material deposition and welding carriage 210 and a guide rail arrangement having a pair of parallel circumferential guide rails 231a, 231b positioned so as to surround the pipe sections 20, 30, respectively. The guide rails 231a, 231b are each supported by a plurality of rail supports 232 which may be temporarily or permanently attached to the structure to be welded. The supports 232 are mounted so that the guide rails 231a are positioned on opposite sides of the joint interface 40.

As in the previous embodiment, the material deposition and welding carriage 210 comprises a carriage housing 212 in which is disposed a weld head 220 with a sonotrode 221 and a reel or other source 252 of weldable feedstock 250. The carriage housing 212 is mounted to an undercarriage 214 configured to engage the guide rails 231a, 231b. The undercarriage 214 is further configured so that the carriage 210 is movable along the guide rails 231a, 231b in an orbital fashion around the joint interface 40. It is also configured to provide a radially outward retaining force that holds the undercarriage 212 in engagement with the guide rails 231 in response to the application of a radially inward welding force to the structure being welded. The undercarriage 214 may include wheels or bearings configured to facilitate the motion of the carriage 210 along the rails 231.

Figure 9:
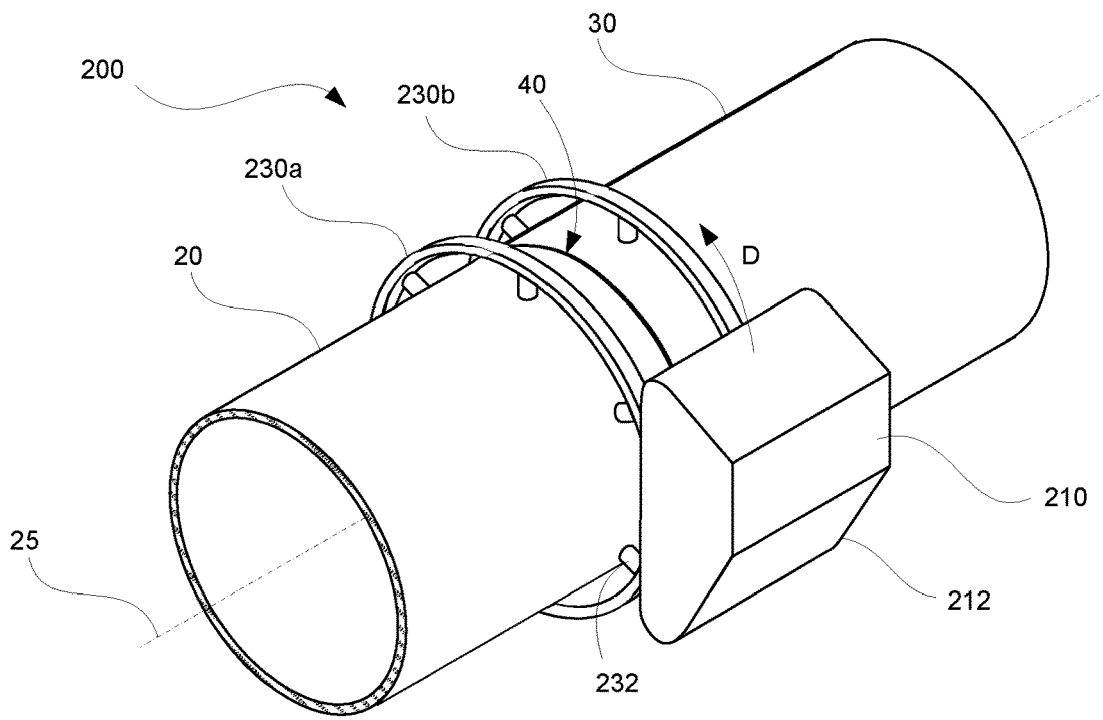
FIG. 9 is a perspective view of the pipe sections of FIG. 7 and a welding apparatus according to an embodiment of the invention.
Figure 10:
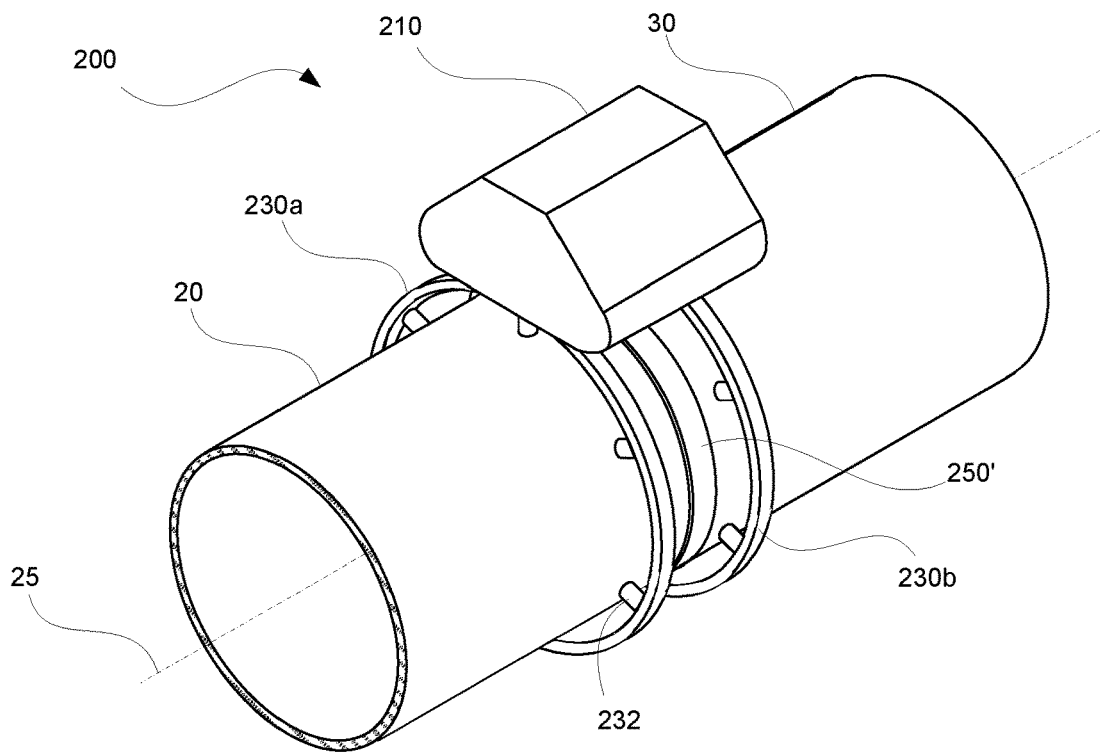
FIG. 10 is a perspective view of the pipe sections of FIG. 7 and the welding apparatus of FIG. 9.
Figure 11:
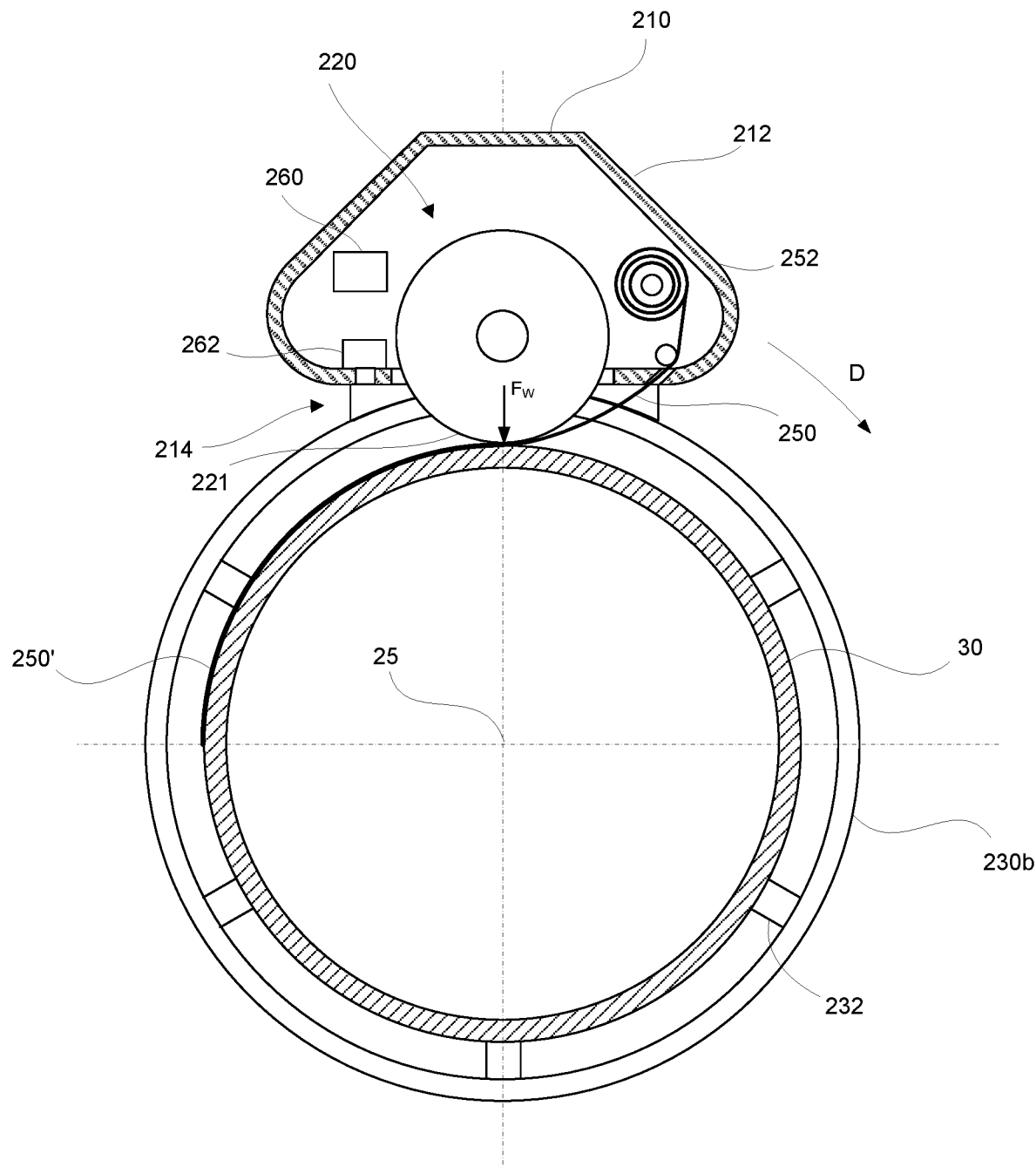
FIG. 11 is a cross-sectional view of the pipe sections of FIG. 7 and the welding apparatus of FIG. 9.

The carriage 210 is configured so that as the carriage 210 moves along the guide rails 231a in the orbital direction D, feedstock 250 is drawn from the feedstock source 252 to pass between the sonotrode 221 and the surface of the structure to be welded. FIG. 9 shows the carriage at an initial position and FIGS. 10 and 11 show the carriage 210 after it has moved a quarter of the way along its orbital path. The weld head 220 is mounted so as to allow application of the welding force $F_W$ to the feedstock 250 and the structure surface as the carriage 210 moves along this path. As before, internal or external electrical, mechanical or electromechanical mechanisms can be used to apply or contribute to the welding force $F_W$.

At the same time the welding force $W_F$ is being applied to the feedstock 250, the sonotrode transducer 222 is energized to produce high frequency vibration to weld the feedstock 250 to the structure (in this case, to the surfaces of the two pipe sections 20, 30). In the illustrated example, the welded feedstock layer 250' bridges the joint line 40 and serves as a first layer of an ultrasonic weld to permanently join the two pipe sections 20, 30. Upon completion of one orbit, the carriage 210 will have applied a complete first layer of welded feedstock 250'. The carriage 210 may simply continue to travel its orbital path to begin forming a second layer of welded feedstock 250'. The process may be repeated as many times as necessary to produce a desired weld without removal or shifting of the carriage 210.

It will be understood that in the case of repairs, a complete circumferential weld layer may not be required. In such cases, the material deposition and welding carriage 210 may be commanded to deposit and sonically weld a feedstock layer at only a portion of the carriage orbit. Upon completion of deposition/welding of a layer over the target area, the carriage 210 could continue around its orbit until reaching the target area again, whereupon a second layer could be initiated over the target area, and so on until a desired weld is achieved.

In some applications, it may be desirable to produce an over-lapping weld to enlarge the joining area along or adjacent the joint line 40. In such applications, the guide rails 231a, 231b could be shifted after formation of an initial circumferential weld, and the process repeated to produce a second weld over-lapping the first.

As in the previous embodiment, the material deposition and welding carriage 210 may also comprise an on-board data processor 260 in communication with the sonotrode transducer 222 and feedstock dispensing mechanism. The processor 260 may also be in communication with external processors or user input devices. In some embodiments, this may be by wireless connection via a network. The processor 260 may also be in communication with an internal or external power source connected to the sonotrode transducer 222. The apparatus 222 may also include a sensor package 262 mounted to the carriage housing 212. The sensor package 262 may be in communication with the data processor 260 and could include, for example, optical, laser, thermal or other sensors configured and positioned to capture data on the applied feedstock 250'. The captured data may be analyzed to assess the integrity of the welded layer 250'.

FIGS. 12-18 illustrate a particular orbital UAM system 1000 that can be used for in-situ welding of two pipe sections 20, 30 according to an embodiment of the invention. While this and other examples discussed herein illustrate the joining of two pipe sections, it will be understood that the system 1000 may be used for new fabrication (e.g., the joining of two pipe sections), for repair operations (e.g., of a crack in a single pipe section or of flawed joint between two sections), or for augmenting an existing structure, weld or joint. The system 1000 includes a welding arrangement 1100 comprising a welding carriage 1110, a carriage support system 1200, and a guide rail arrangement 1300 comprising a pair of parallel guide collar assemblies 1300a, 1300b.

The guide collar assemblies 1300a, 1300b are each formed from a plurality of arcuate guide members 1310 that are attachable to one another to form a complete circular guide track. In the illustrated embodiment, there are two semi-circular guide members 1310, but any number of smaller arced members could be used. Each guide member 1310 has an inner circumferential wall 1311 and an outer circumferential wall 1312 connected by a web 1313. The inner and outer walls 1311, 1312 and the web 1313 collectively define a forward facing guide channel 1315. Typically, the inner circumferential wall 1311 will be sized to fit around the outer diameter of the pipe sections 20, 30. The outer circumferential wall 1312 may be sized and the web 1313 positioned so as to size the guide channel 1315 to receive a guide and/or drive mechanism of the carriage support and rive system 1200. In particular embodiments, the guide member 1310 may have an inward facing outer gear rack 1318 along the inner side of the outer circumferential wall 1312. The outer guide rack 1318 is sized and configured to operatively support and engage a drive gear of the carriage support and rive system 1200. The guide member 1310 may also have an inner guide flange 1316 on the outer side of the inner circumferential wall 1311. In alternative embodiments, the guide member 1310 may have an outward facing guide rack on the inner circumferential wall 1311 instead of the outer guide rack 1318. The guide members 1310 may be assembled to one another in any suitable fashion that does not interfere with the reception of a guide mechanism into and along the guide channel 1315. In particular embodiments, the guide members 1310 may include passages 1319 that are aligned with one another when the guide members 1310 are assembled and are configured for receiving a fastener (e.g., a machine screw or bolt) to removably hold the assembled guide members 1310 to one another.

Figure 12:
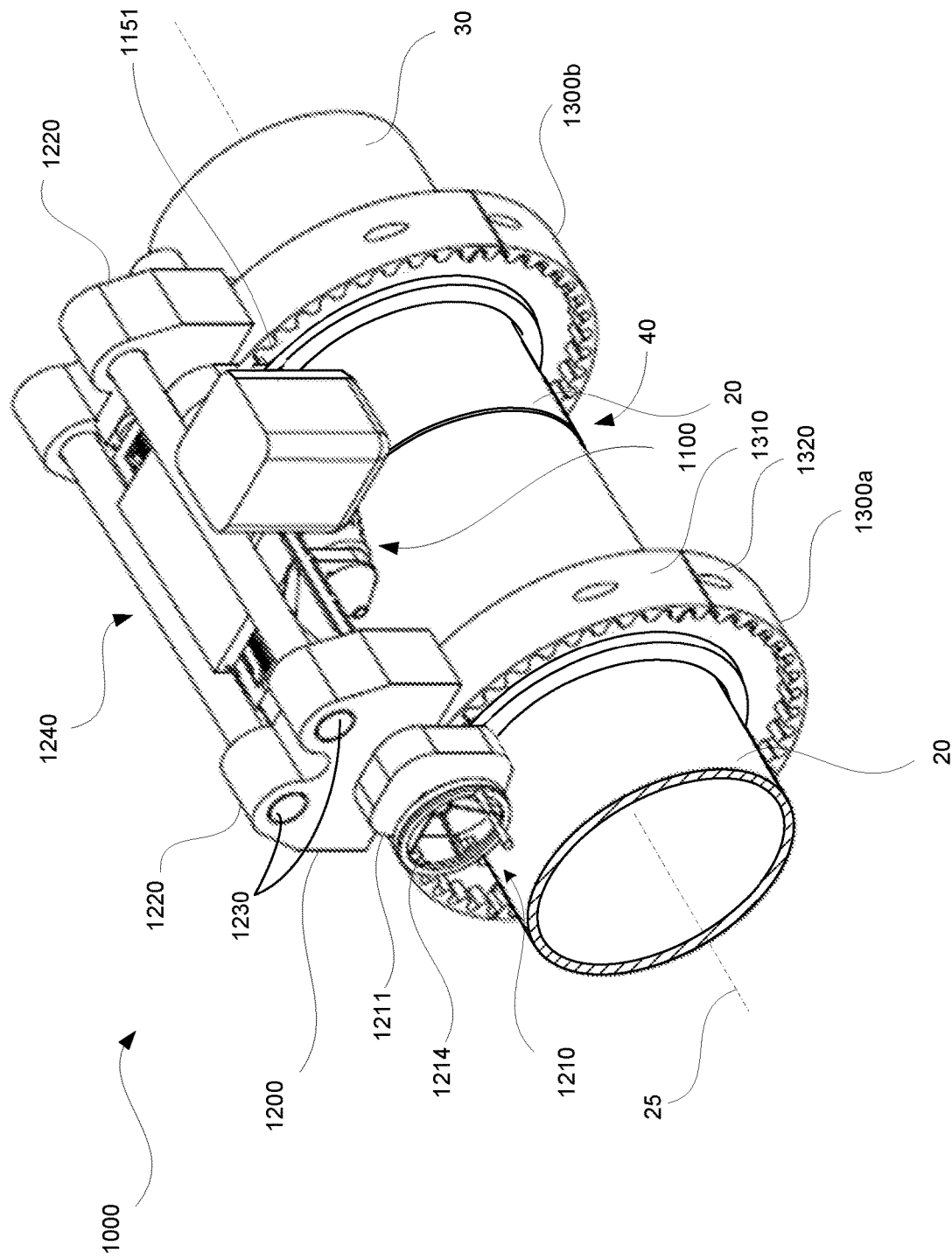
FIG. 12 is a sectioned perspective view of two pipe sections and a welding apparatus according to an embodiment of the invention.
Figure 13:
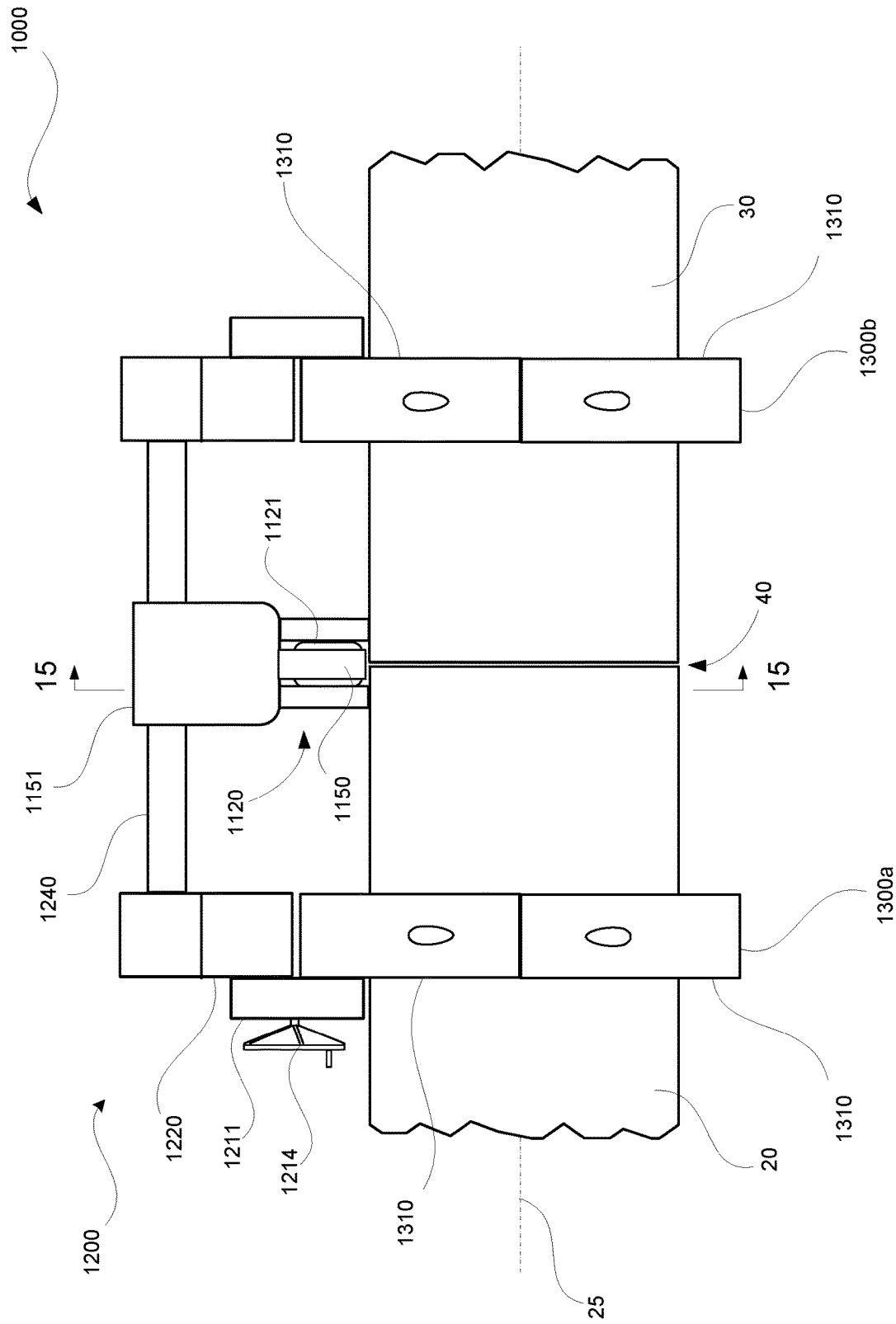
FIG. 13 is a side view of the pipe sections and welding apparatus of FIG. 12.

As shown in FIGS. 12 and 13, a first set of guide members 1310 may be assembled to one another so as to form a first complete guide assembly 1300a surrounding the first pipe segment 20 and a second set of guide members 1310 may be assembled to one another to form a second complete guide assembly 1300b surrounding the second pipe segment 30 so as to be parallel to the first complete guide assembly 1300a. As used herein, the term "parallel" may be applied to matching curves in parallel planes where every point on the first curve is equidistant form its corresponding point of the second curve. When so-installed, the guide members 1300a 1300b provide substantially parallel guide rails. In some embodiments, only one of the two guide assemblies 1300a, 1300b need have a drive gear rack.

It will be understood that in some embodiments a single guide assembly may be used without departing from the spirit of the invention. In such embodiments, a monorail-type carriage may be used to engage the guide assembly.

Figure 17:
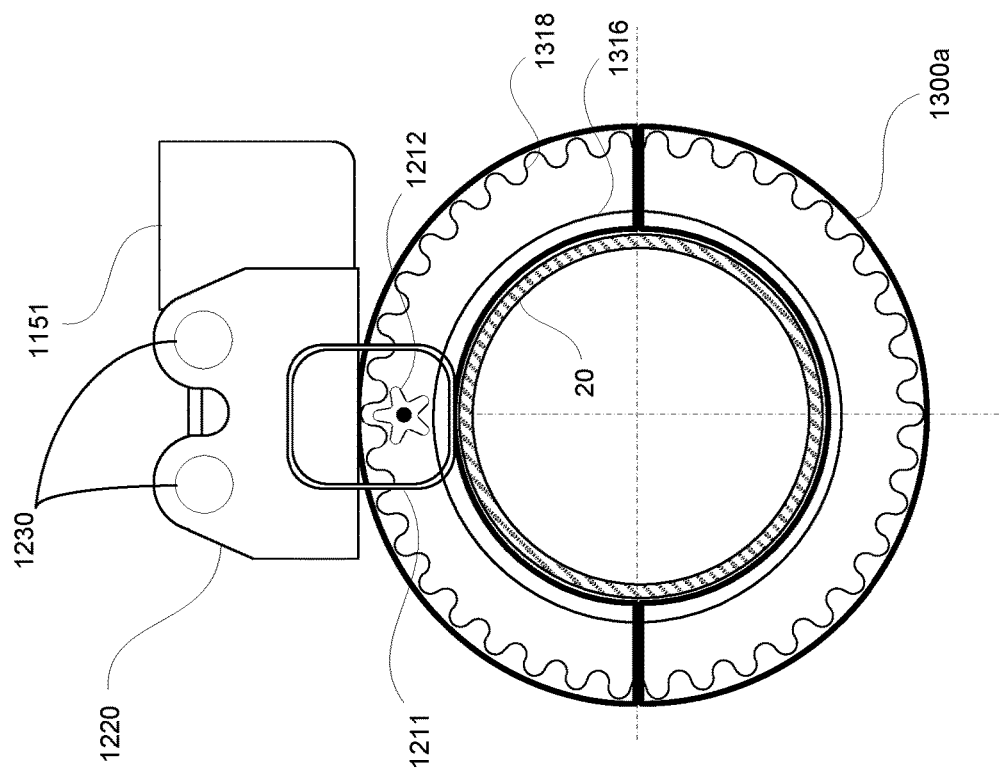
FIG. 17 is an end view of the pipe sections and welding apparatus of FIG. 12.
Figure 16:
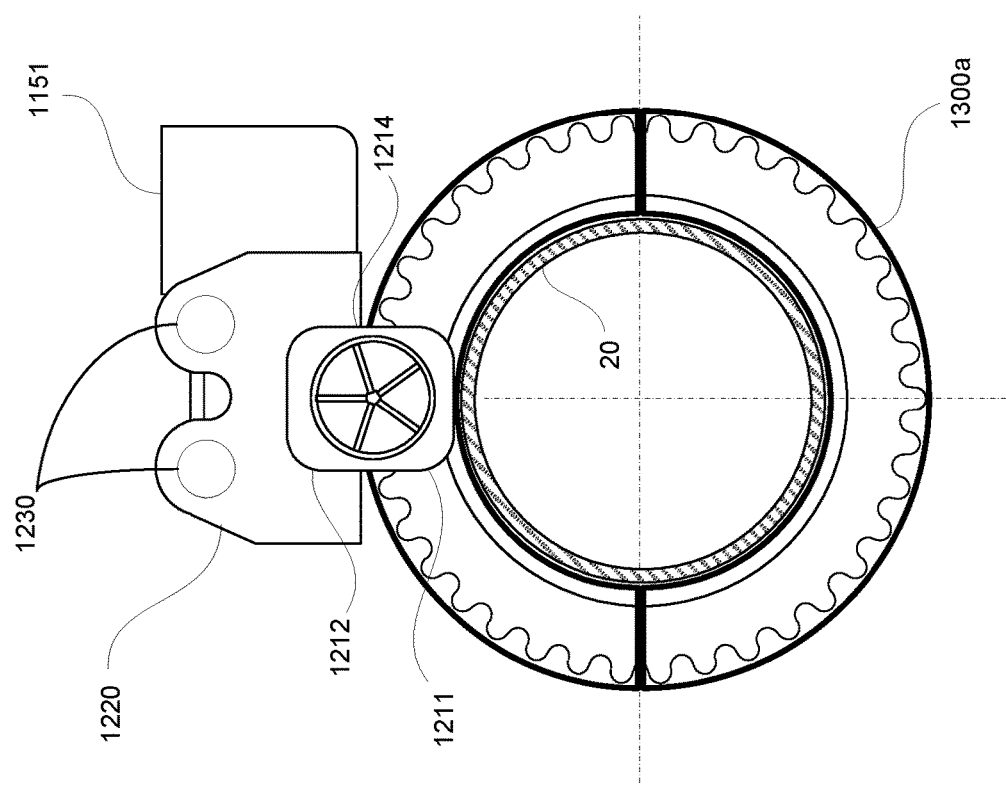
FIG. 16 is an end view of the pipe sections and welding apparatus of FIG. 12.
Figure 18:
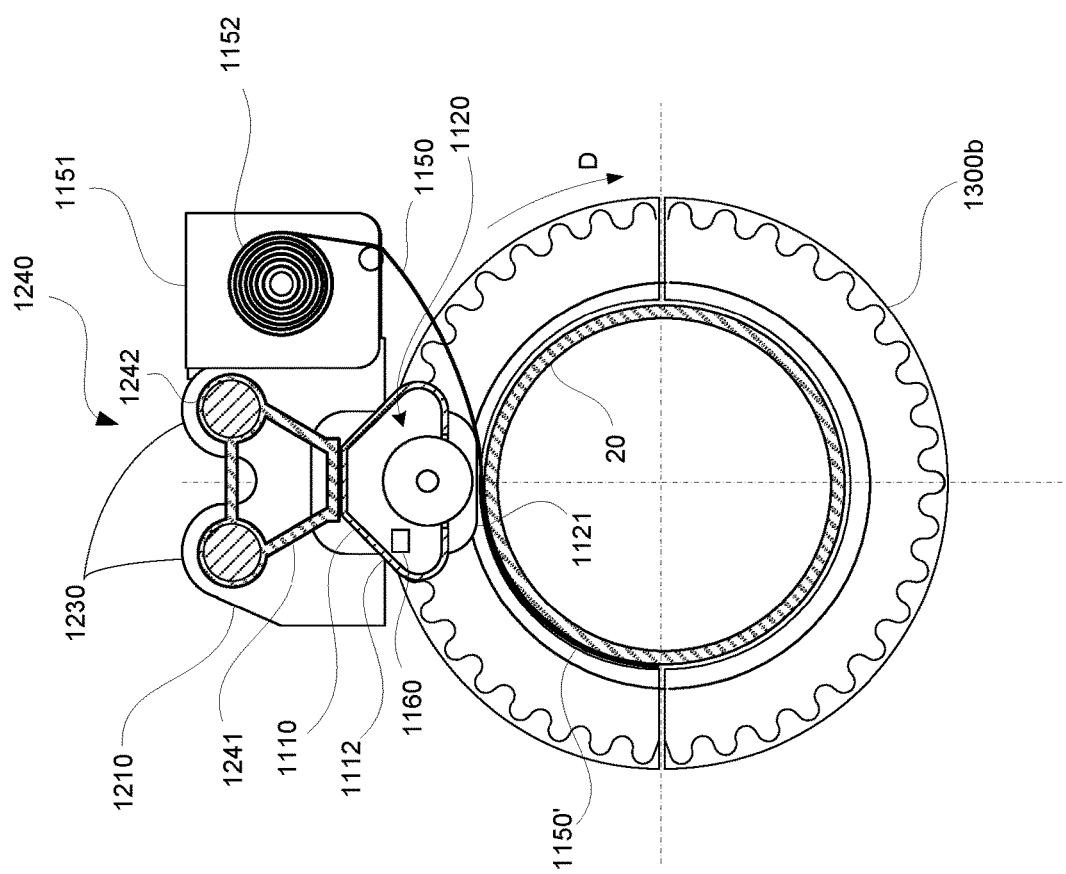
FIG. 18 is a cross-sectional view of the pipe sections and welding apparatus of FIG. 12.

The carriage support and drive system 1200 comprises a pair of support blocks 1220 configured to support a carriage mounting arrangement 1240. The carriage mounting arrangement 1240, which will be discussed in more detail below, includes one or more elongate beams 1230 having a polygonal or circular cross-section. Each support block 1220 is slidably mountable to one of the guide assemblies 1300a, 1300b. In some embodiments, the support block 1220 is mountable to the guide assembly 1300a, 1300b by a drive arrangement 1210. The drive arrangement 1210 includes a drive box 1211 attached to the support block 1220. A guide and/or drive mechanism is attached to and disposed within the drive box 1211. This mechanism is configured for engagement with and movement along the guide channel 1315 of the guide assembly 1300. As shown in FIG. 17, in which the front face of the drive box 1211 is removed, the guide and/or drive mechanism may include a drive gear 1212 rotatably mounted to a shaft that is, in turn, mounted to the drive box 1211. The drive gear 1212 is configured to engage the gear racks 1316, 1318 of the guide assembly 1300. The drive gear 1212 may be rotated by a rotation mechanism. In some embodiments, the rotation mechanism may be an external wheel 1214 configured for manual rotation. In other embodiments, the rotation mechanism may be or include a motor configured to impart automated rotation of the drive gear 1212. In either case, the rotation mechanism may be used to directly rotate the drive gear shaft. In some embodiments, however, the rotation mechanism may be coupled to the drive gear shaft by additional gearing housed within the drive box 1211.

The carriage support and drive system 1200 may be assembled in place by mounting a first support block 1220 and drive arrangement 1210 to the forward guide assembly 1300a and a second support block 1220 and drive arrangement 120 to the rear guide assembly 1300b with the first and second support blocks 1220 connected by the beams 1230.

As in the previous embodiments, the welding carriage 1110 comprises a carriage housing 1112 in which is disposed a weld head 1120 with a sonotrode 1121. The carriage housing 1112 is mounted to the support blocks 1220 by the mounting arrangement 1240 that includes the beams 1230. In some embodiments, such as the embodiment illustrated in FIGS. 18 and 19, the mounting arrangement 1240 may include a rigid frame 1241 having a sleeve 1242 for each beam 1230. The sleeve 1242 is configured for receiving the beam 1230 there-through. In some embodiments, the sleeve 1242 may be configured to slidably receive the beam 1230, thereby allowing the carriage 1110 to slide along the beam 1230. This effectively allows the carriage 1110 to be translated parallel to the pipe segment axis 25 when the UAM system 1000 is attached to the pipe segments 20, 30 (or to a single pipe segment).

While FIG. 12 shows two beams 1230, additional beams may be used. Using multiple beams may facilitate controlled movement of the carriage 1110 along the beams. Such movement could be accomplished electrically via an appropriate motor (e.g., stepper, servo, etc.) and could be used to position the carriage 1110 anywhere along the beams 1230.

It will be understood by those of ordinary skill in the art that activation of the drive mechanism engaging the guide assembly (e.g., rotating the drive gear 1212) results in the circumferential travel of the carriage support and drive system 1200 and the welding carriage 1110 around the pipe segments 20, 30 (or pipe) to which the system 1000 is attached. The frame 1241 is sized and configured so that the weld head 1120 is positioned or positionable for contacting and applying a welding force to a feedstock layer 1150' applied to the surfaces of the pipe segments 20, 30 at the joint interface 40. In the illustrated embodiment, the UAM system 1000 includes a feedstock magazine 1151 attached to the frame 1241 separate from the carriage 1110. As the carriage and the magazine 1151 travel in the direction D, feedstock 1150 may be drawn from a reel 1152 disposed within the magazine 1151 and applied to the surfaces of the pipe segments 20, 30. It will be understood that the carriage 1110 may alternatively carry an on-board reel or other source of feedstock 1150 as in the previous embodiments.

Operation of the UAM system 1000 is similar to that of the previous embodiment. As the carriage 1110 moves along the guide assemblies 1300a, 1300b in the orbital direction D, feedstock 1150 is drawn from the feedstock source 1152 to pass between the sonotrode 1121 and the surface of the structure to be welded. The weld head 1120 is mounted so as to allow application of the welding force to the feedstock 1150 and the structure surface as the carriage 1110 moves along this path. As before, internal or external electrical, mechanical or electromechanical mechanisms can be used to apply or contribute to the welding force. During operation, the carriage support and drive system 1200 provides a retaining force that holds the weld head 1120 in engagement with the feedstock 1150' in response to the application of a radially inward welding force to the structure being welded. At the same time the welding force is being applied to the feedstock 1150, the sonotrode transducer 1122 is energized to produce high frequency vibration to weld the feedstock 1150 to the structure (in this case, to the surfaces of the two pipe sections 20, 30). The welded feedstock layer 1150' bridges the joint line 40 and serves as a first layer of an ultrasonic weld to permanently join the two pipe sections 20, 30. Upon completion of one orbit, the carriage 1110 will have applied a complete first layer of welded feedstock 1150'. The carriage 1110 may simply continue to travel its orbital path to begin forming a second layer of welded feedstock 1150'. The process may be repeated as many times as necessary to produce a desired weld without removal or shifting of the carriage 1110.

In some applications, it may be desirable to produce an over-lapping weld to enlarge the joining area along or adjacent the joint line 40. In such applications, the guide assemblies 1300a, 1300b could be shifted after formation of an initial circumferential weld, and the process repeated to produce a second weld over-lapping the first. In embodiments where the frame 1241 is slidable along the beams 1230, however, the frame 1241, carriage 1110 and magazine 1151 may be moved along the pipe centerline 25 to a new position to form the overlapping layer without moving the guide assemblies 1300a, 1300b.

As in the previous embodiment, the welding carriage 1110 may also comprise an on-board data processor 1160 in communication with the sonotrode transducer 1122 and feedstock dispensing mechanism. The processor 1160 may also be in communication with external processors or user input devices. In some embodiments, this may be by wireless connection via a network. The processor 1160 may also be in communication with an internal or external power source connected to the sonotrode transducer 1122. The apparatus 1122 may also include a sensor package (not shown) mounted to the carriage housing 1112.

Figure 19:
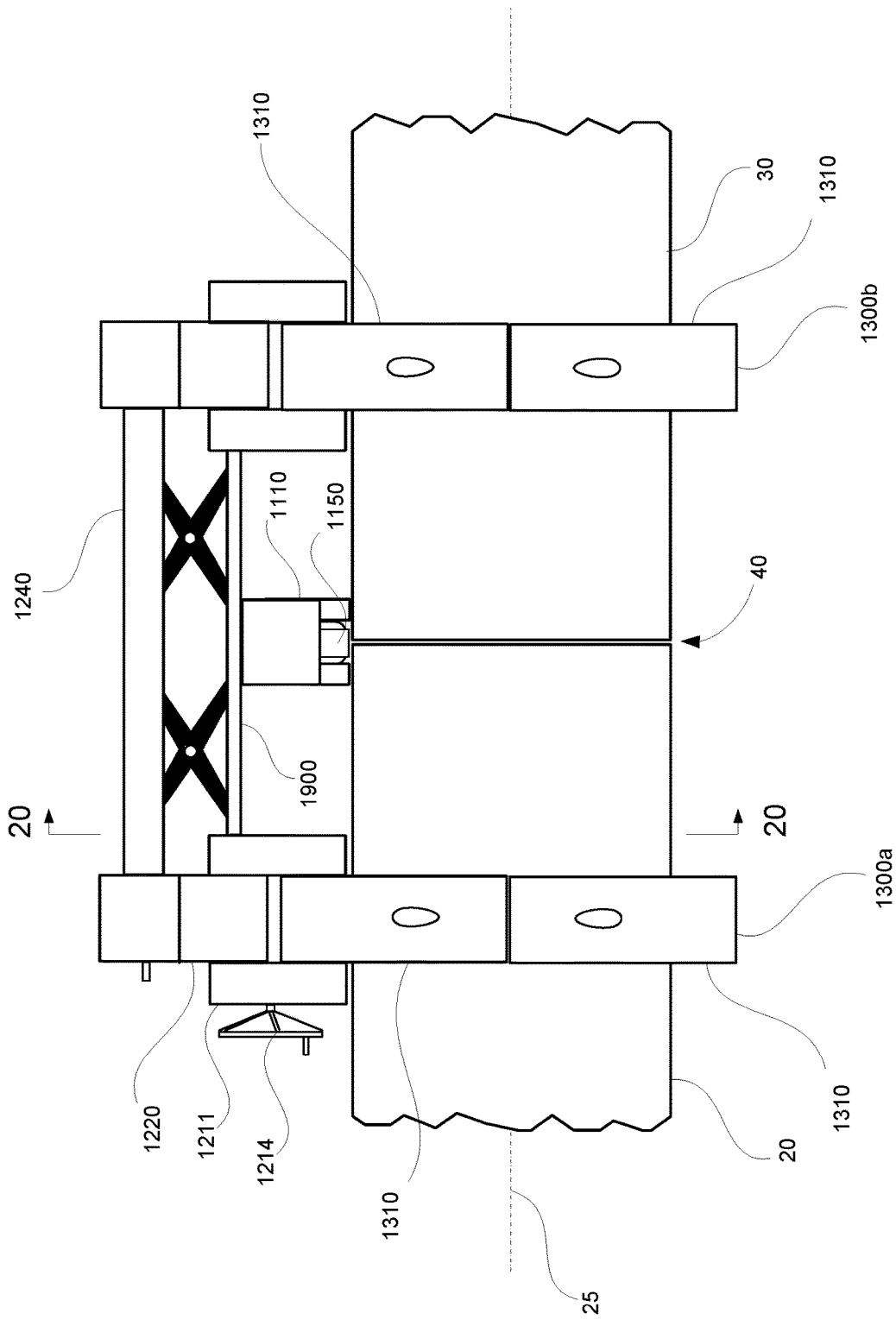
FIG. 19 is a side view of two pipe sections and a welding apparatus according to an embodiment of the invention.
Figure 20:
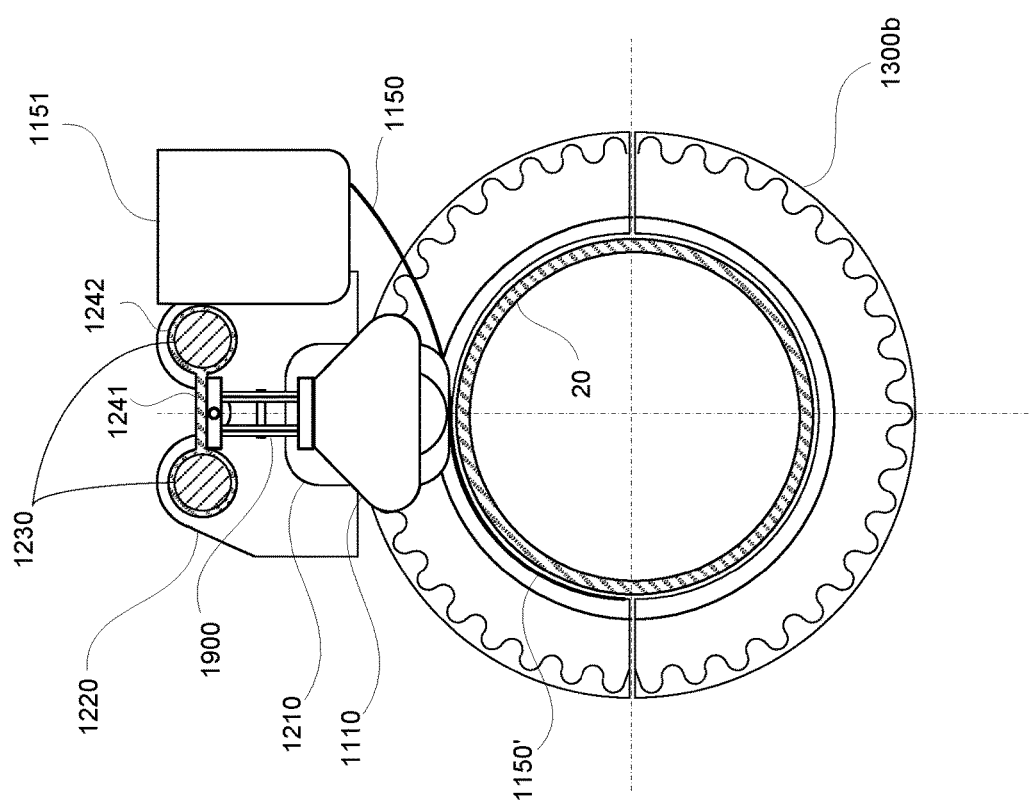
FIG. 20 is a is a cross-sectional view of the pipe sections and welding apparatus of FIG. 19.

FIGS. 19 and 20 illustrate a variation of the UAM system 1000 in which the lower portion of the frame 1241 is replaced by an extension and retraction arrangement 1900 that is configured to provide controllable radial movement of the carriage 1110 relative to the pipe centerline 25. The arrangement 1900 may, in particular comprise a scissor jack, which has the advantage of producing a substantial linear force as the result of application of a relatively low rotational force. In ordinary jacks, the load applied to the jack is always compressive. Thus, when a load is applied to the top of a standard scissor jack, compressive forces are transmitted into the supports. These forces, in turn, produce a tensile load in the jack screw.

In certain embodiments of the present invention, however, the extension and retraction arrangement 1900 may be or include a particular type of scissor jack that is configured for both compression and tension loading. This type of jack is referred to herein as a bidirectional scissor jack. A bidirectional scissor jack usable in the present invention may include a number of support element structures, each formed from two elongate support elements pivotally attached to one another at their centers so that they form an X-shaped structure. In a typical embodiment, two of these X-shaped pairs of support elements are arranged in tandem. One support element of each pair has one end that is attached to the base of the jack by a fixed pivot while the other end is attached to a load platform by a pivot that is allowed to slide along a slot or rail formed in the platform support structure. The other support element has one end attached to the load platform by a fixed pivot while the other end is pivotally attached to a threaded block. The threaded block is configured to receive a threaded member referred to herein as a lead screw or jack screw. The lead screw for each pair engages a thrust bushing at one end. This bushing is fixedly attached to the base structure so that loads can be transmitted from the lead screw to the base structure through the bushing. The other end of the lead screw is coupled to the end of the lead screw associated with the other pair of support elements. The lead screw coupling may be configured so that it is attached or attachable to the base structure by a bearing that allows the coupling and the lead screws to rotate.

As noted above, one end of one of the support members of each pair is attached to a threaded block through which the lead screw passes. The pivot used to make this attachment may be configured to slidably engage a slot or rail formed in the base structure. Thus, when the lead screw is rotated, it causes the threaded block to translate along the base toward or away from the thrust bushing engaged by the lead screw. When the threaded block moves toward the thrust bushing, it takes the end of the attached support member with it. This causes the angle of the support member to steepen. By virtue of the central pivotal connection of the support members, the angle of the second member of the support element pair also steepens. The combined action of the support elements causes extension of the load platform. When the lead screw is turned in the opposite direction, the action is reversed and the load platform is retracted.

The tandem arrangement of the support element pairs allows both to be operatively connected to a single lead screw assembly having two oppositely threaded lead screw portions (one for each support pair). The tandem arrangement also provides an enhanced ability to transmit and counter both compressive and tensile loads. Under compressive loading, the two halves of the lead screw assembly are each placed in tension and push against one another through the lead screw coupling. Their outer ends are constrained by the thrust bushings. This is the response to a weight placed on the load platform in a manner similar to those applied to standard jacks. The bidirectional jack, however, is configured so that a load (e.g., the welding carriage 1110) may be attached to the load platform rather than merely resting on it. Under certain circumstances (e.g., the suspension of the welding carriage 1110 beneath the jack), such a load may apply a tensile load. In this scenario, each of the lead screw halves is placed in compression and is constrained by the thrust bushing and the lead screw coupling.

Figure 21:
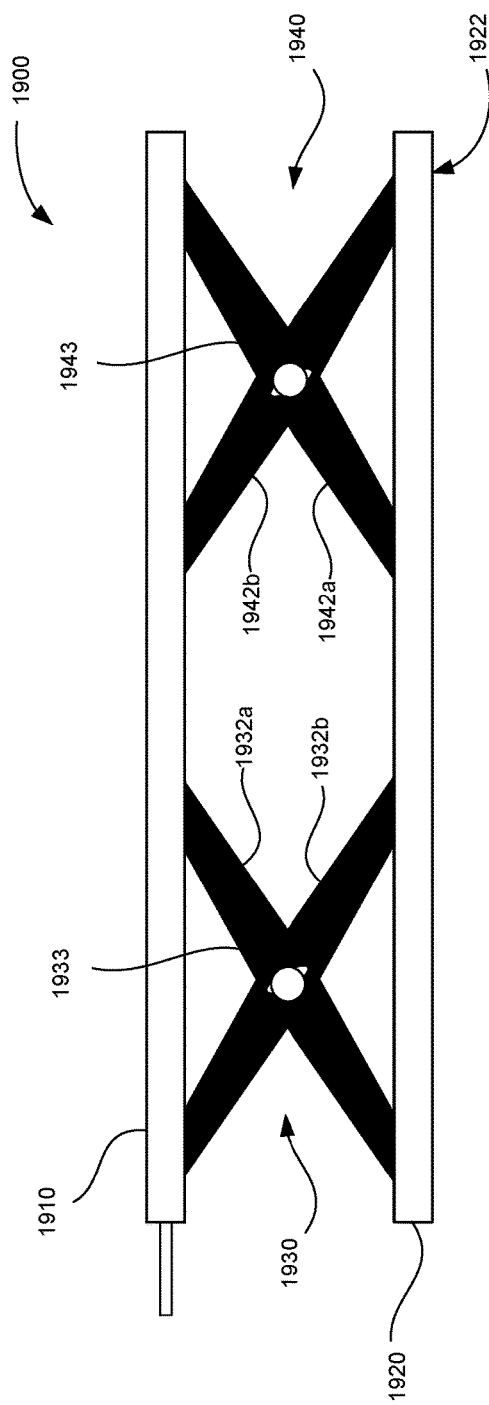
FIG. 21 is a front view of a bidirectional jack according to an embodiment of the invention.
Figure 22:
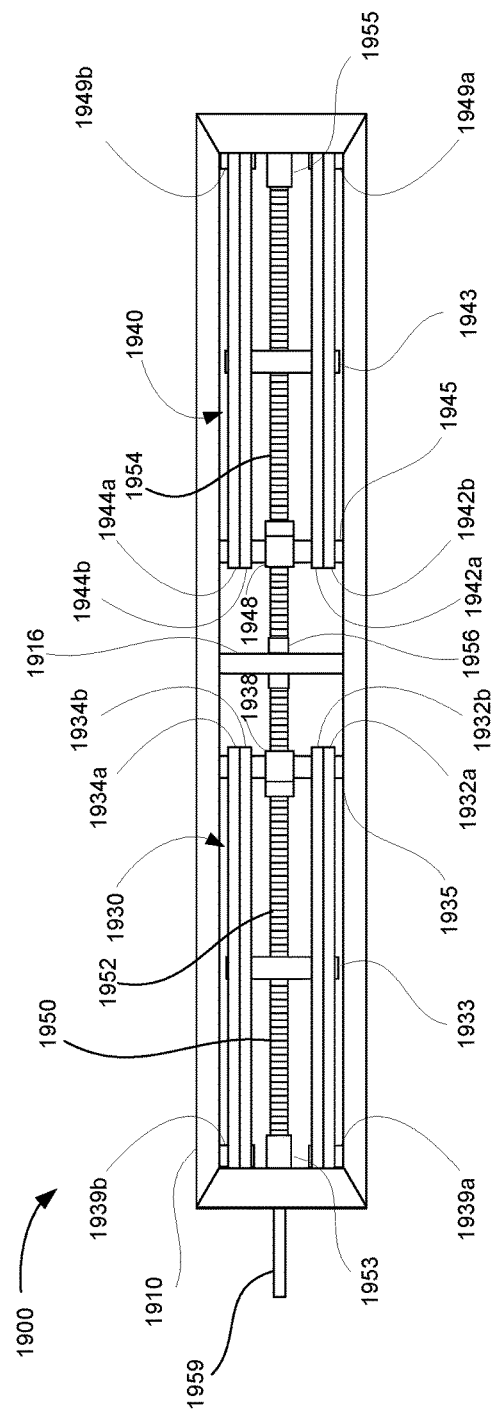
FIG. 22 is a top view of the bidirectional jack of FIG. 21.
Figure 23:
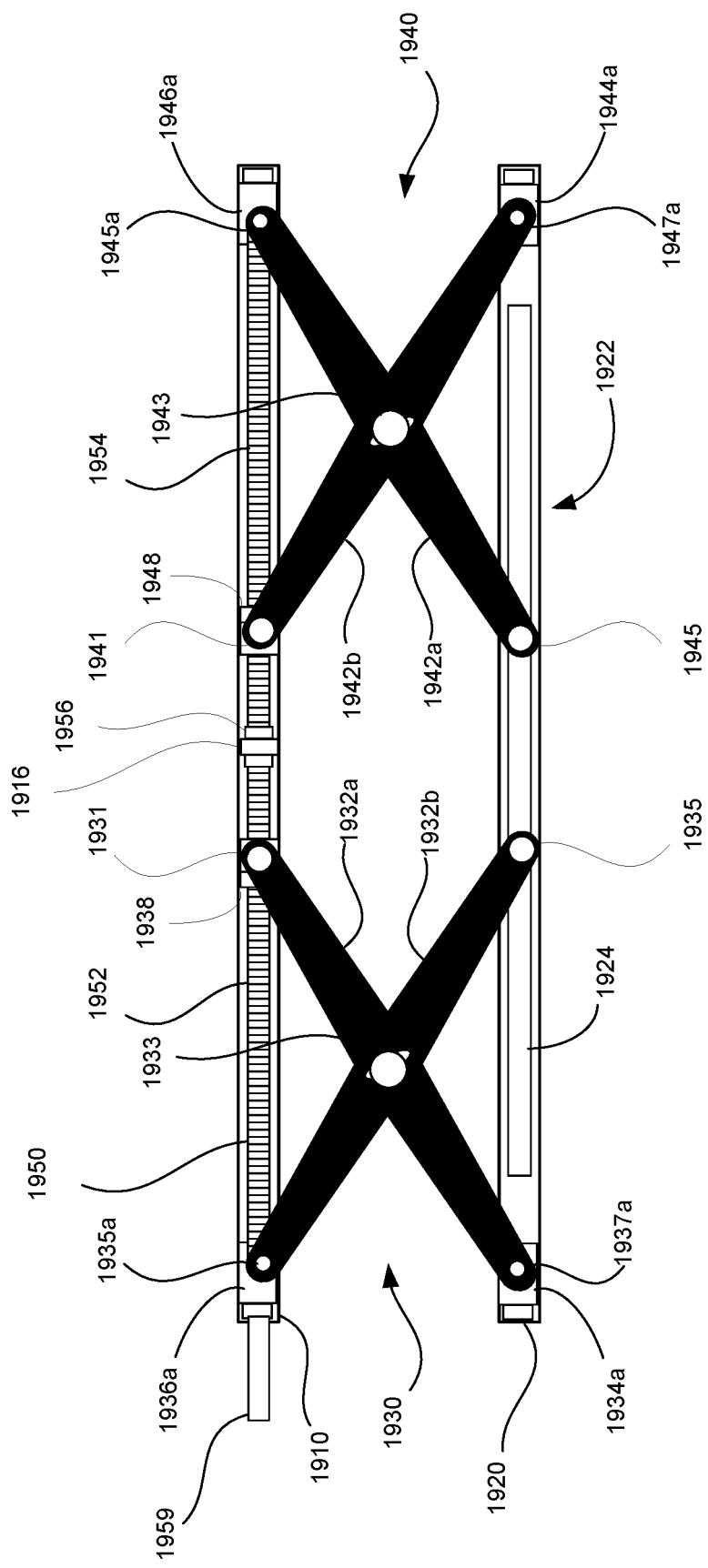
FIG. 23 is a front section view of the bidirectional jack of FIG. 21.
Figure 24:
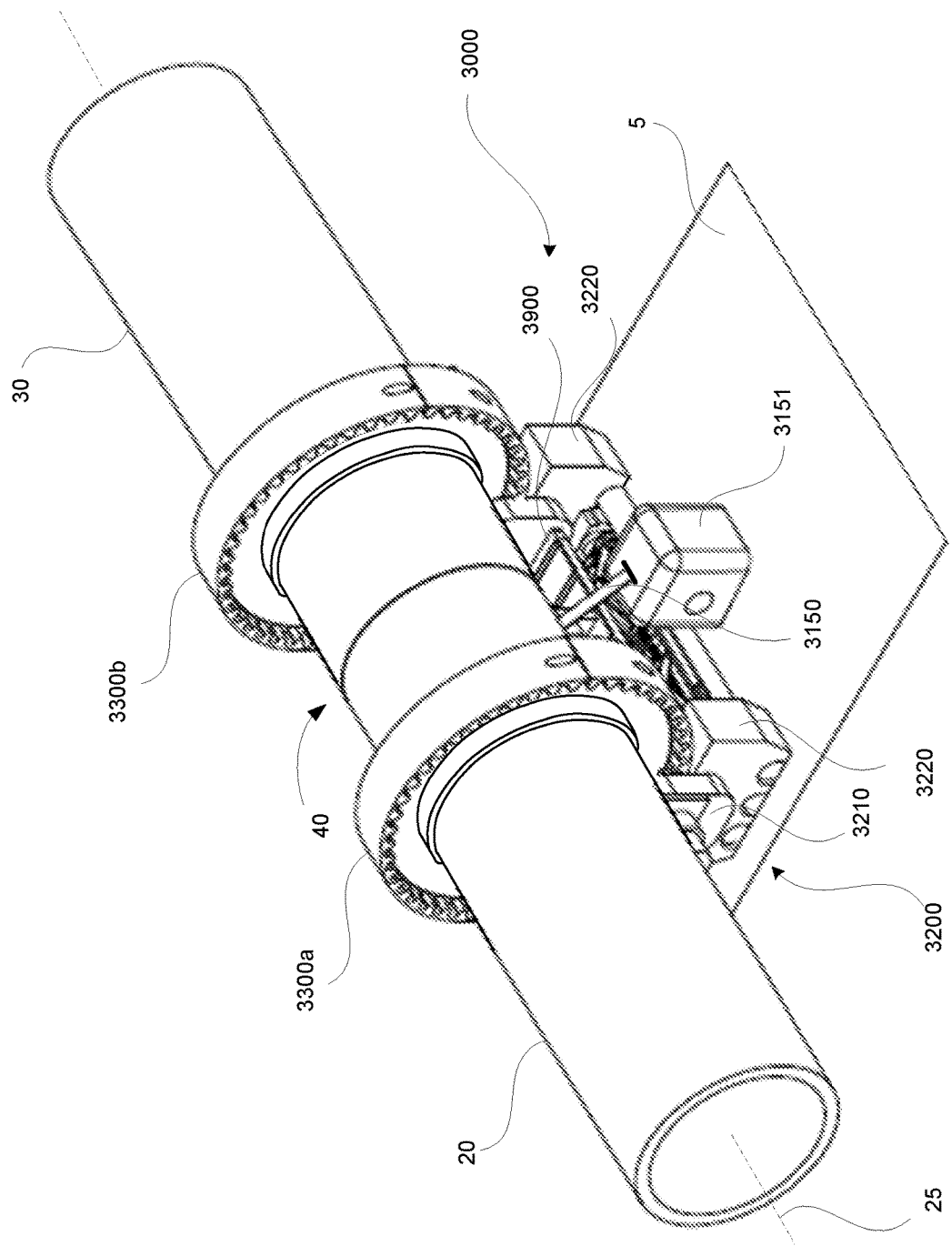
FIG. 24 is a perspective view of two pipe sections and a welding apparatus according to an embodiment of the invention.
Figure 27:
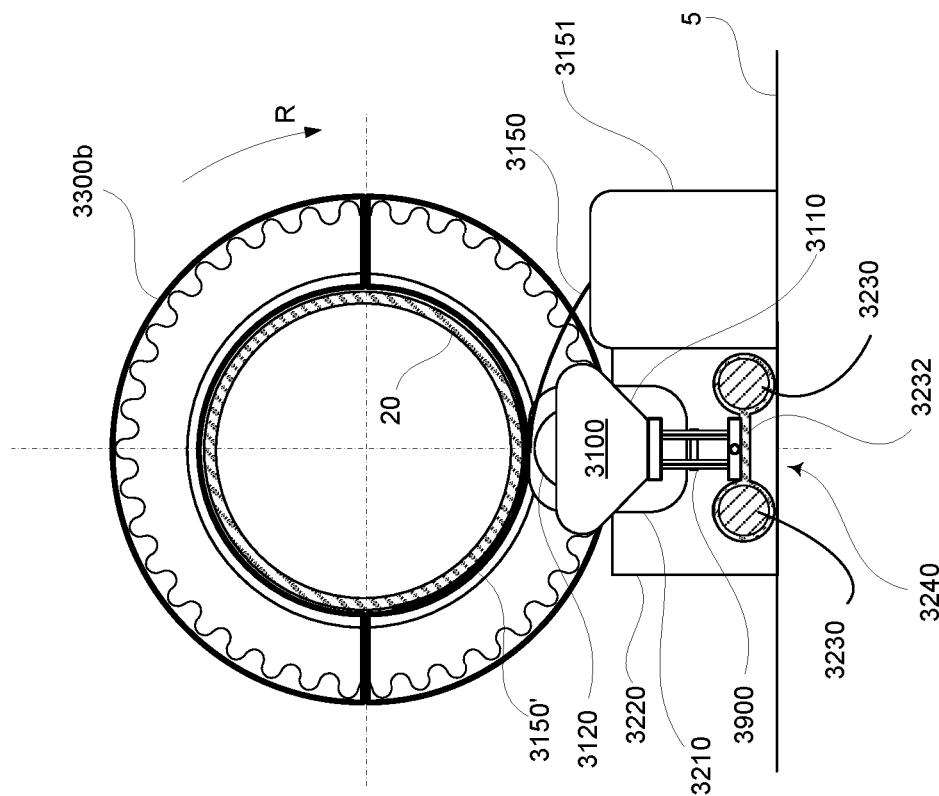
FIG. 27 is a cross-sectional view of the welding apparatus of FIG. 24.
Figure 26:
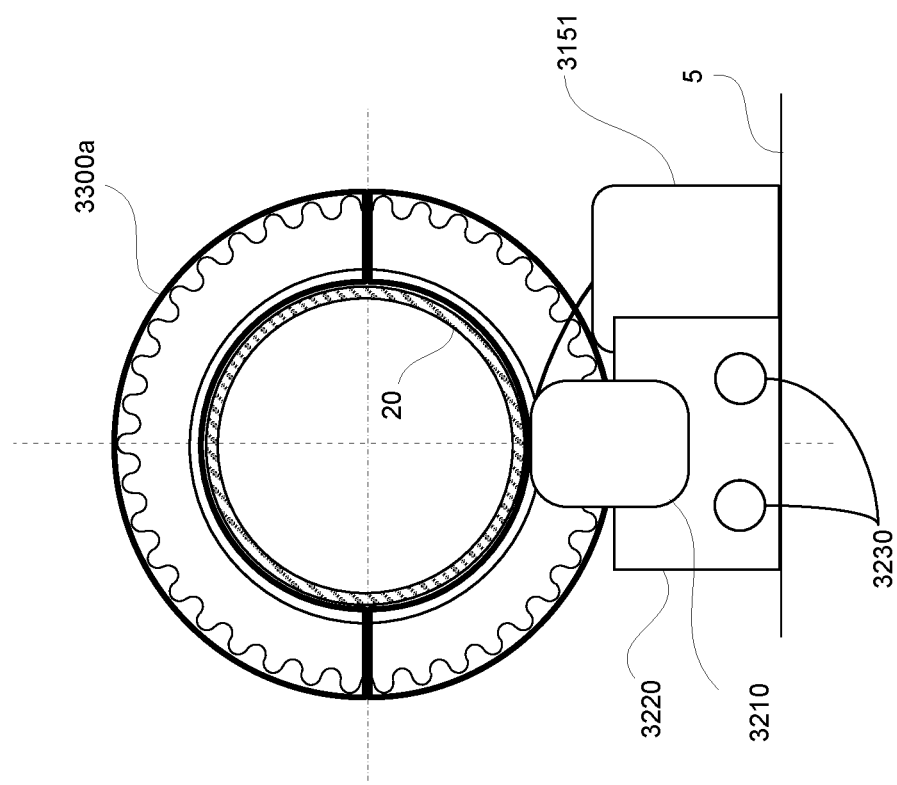
FIG. 26 is an end view of the welding apparatus of FIG. 24.

FIGS. 21-23 illustrate a particular jacking arrangement 1900 in the form of a bidirectional scissor jack configured as described above. The bidirectional jack 1900 has a base structure 1910 that can be attached to the frame 1241 and a load platform structure 1920 supported by four pairs of x-shaped support element structures. The load platform structure 1920 has a load support surface 1922 and may have connectors (not shown) for attaching the carriage 1110 to the support surface 1922. Two of the x-shaped support element structures are positioned side-by-side on one side of the jack 1900 and, for convenience, are collectively referred to as the left support assembly 1930, and two are positioned side-by side on the other side of the jack 1900 and are referred to as the right support assembly 1940. The left support assembly 1930 has two elongate support members 1932*a*, 1932*b* forming the front left support structure visible in FIGS. 21, 22 and 23. The left support assembly 1930 also includes elongate support members 1934*a*, 1934*b*, which are visible only in FIG. 22. The right support assembly 1940 has two elongate support members 1942*a*, 1942*b* forming the front right support structure visible in FIGS. 21, 22 and 23. The right support assembly 1940 also includes elongate support members 1944*a*, 1944*b*, which are visible only in FIG. 22.

The left support members 1932*a*, 1932*b*, 1934*a*, 1934*b* are all connected by a pivot member 1933. Front left support members 1932*a*, 1932*b* are paired as previously described as are back left support members 1934*a*, 1934*b*. The right support members 1942*a*, 1942*b*, 1944*a*, 1944*b* are similarly connected by pivot member 1943. The lower end of each of support members 1932*b* and 1934*b* are connected by pivot member 1935, which is slidably connected to a rail assembly or slot 1924 of the load platform structure 1920. The lower end of each of support members 1932*a* and 1934*a* are respectively pivotally connected to the load platform structure 1920 by a first pivot member 1937*a* and a second pivot member that is not shown. The upper end of support members 1932*b* and 1934*b* are respectively pivotally attached to the base structure 1910 by a first pivot member 1939*a* and a second pivot member 1939*b*. The upper end of support member 1932*a* is pivotally attached to a threaded block 1938 by a pivot 1931. The upper end of support member 1934*a* is similarly attached to the threaded block 1938 by a separate pivot that is not shown. The pivots used to attach the support members 1932*a*, 1934*a* to the threaded block 1938 may be configured so as to be slidably retained in a slot or rail assembly (not shown) of the base structure so as to constrain motion of the pivots to the horizontal direction (i.e., the direction along the length of the base).

It will be understood that right support members 1942*a*, 1942*b*, 1944*a*, 1944*b* are similarly mounted to the load platform structure 1920, the base structure 1910, and threaded block 1948 by corresponding pivot members 1945, 1949*a*, 1949*b*, 1945, 1941.

The bidirectional jack 1900 includes a lead screw assembly 1950 that is made up of left and right lead screw portions 1952, 1954 joined by a lead screw coupling 1956. The left lead screw portion 1952 is configured to threadably engage a threaded passage through the left threaded block 1938 and the right lead screw portion 1954 is configured to threadably engage a threaded passage through the right threaded block 1948. In the illustrated embodiment, the left and right lead screw portions 1952, 1954 are oppositely threaded and that threaded blocks 1938, 1948 are arranged correspondingly. In alternative embodiments, the threads of the jack screw may all be in the same direction and one of the threaded blocks reversed. The lead screw coupling 1956 may be rotatably retained and supported by a bearing attached to a supporting wall 1916 extending across the width of the base structure 1910. The outer ends of the left and right lead screw portions 1952, 1954 are rotatably attached to the base structure by thrust bearings 1953, 1955. The thrust bearings 1952, 1954 are configured to transmit both compressive and tensile loads between the lead screw portions 1952, 1954 and the base structure 1910. A drive shaft 1959 may be attached to either of the lead screw portions 1952, 1954 for use in selectively turning the lead screw assembly 1950 for raising or lowering the load platform 1920.

Operation of the bidirectional jack 1900 is accomplished by manual or powered rotation of the of the lead screw assembly 1950. Such rotation results in simultaneous extension or retraction of all four of the support structure pairs. Further compressive and tensile loading is distributed among all four structures for transmission to the base structure 1910.

The bidirectional jack 1900 can be used to move the welding carriage 1110 radially inward or outward relative to the centerline 25 of the pipe segments 20, 30 to establish a desired distance from the surface or surfaces to which a weld is to be applied. The jack 1900 can also be used to supply a desired welding force to feedstock applied to the surface or surfaces to be welded.

In some in-the-field applications, pipe repair or joinder operations may involve pipe sections that are movable to some degree. In such applications, it may be desirable to have a welding apparatus that remains fixed during welding operation. FIGS. 24-27 illustrate an exemplary scenario in which the welding target consists of two pipe sections 20, 30 similar to those used to illustrate the previous embodiment. In this case, however, the pipe sections 20, 30 are not fixed in place.

In this scenario, the pipe sections 20, 30 may be joined using an orbital UAM system according to another embodiment of the invention. This system takes the form of a welding apparatus 3000 a support fixture 3200 comprising two or more supports 3220 supported by a floor or other support surface 5 and configured to receive and rotatably support the pipe sections 20, 30 for joinder thereof. It will be understood that the fixture 3200 may also be used to receive a single pipe section for conducting a circumferential welding operation thereon. Each support 3220 of the support fixture 3200 has a drive assembly 3210 attached thereto. The drive assembly 3210 is configured to engage and support a guide collar assembly 3300 for supporting and selectively rotating the pipe sections 20, 30 (or the single pipe section) during a welding operation. The guide collar assemblies 3300*a*, 3300*b* may be substantially similar to the guide collar assemblies 1300*a*, 1300*b* of FIGS. 12-18. In some embodiments, however, the guide collar assemblies 1300*a*, 1300*b* may have gear racks on both sides. The drive assembly 3210 may be substantially similar to the drive arrangement 1210 if FIGS. 16 and 17. The primary difference between the drive arrangement 3210 and the previous drive arrangement 1210 is that the arrangements 3210 of the apparatus 3000 remain fixed and operation of the drive mechanisms result in rotation of the guide collar assemblies 3300*a*, 3300*b*. In the illustrated embodiment, each drive arrangement 3210 has a first engagement portion 3212 for engaging the gear racks of one side of a guide collar assembly 3300 and a second engagement portion 3214 for engaging the gear racks of the other side of the guide collar assembly 3300.

The guide collar assemblies 3300*a*, 3300*b* are attached to the pipe sections 20, 30 in a manner similar to that of the previous embodiment. The pipe sections 20, 30 are then positioned so that the guide collar assemblies 3300*a*, 3300*b* engage and are supported by the drive arrangements 3210 and the supports 3220.

The welding apparatus 3000 also comprises a material deposition and welding carriage 3100 comprising a housing 3110 in which is disposed a weld head 3120 with a sonotrode 3120. The carriage 3100 may be configured to receive weldable feedstock 3150 from a feedstock magazine 3151 mounted to the surface 5 or the support fixture 3200. The magazine 3151 may comprise a reel or other source from which the weldable feedstock 3150 may be drawn. Alternatively, a feedstock source may be disposed within the housing 3110 in a manner similar to previously described embodiments.

The welding carriage 3100 is supported by a pair of beams 3230 mounted to the supports 3220 and a mounting arrangement 3240. In some embodiments the mounting arrangement 3240 may include a rigid frame similar to the frame 1241 of FIG. 18. In other embodiments, such as the illustrated embodiment, the mounting arrangement 3240 includes a sleeved platform 3232 mounted to the beams 3230. In some embodiments, the platform 3232 may be slidably mounted to the beams 3230 so that the carriage 3100 can move longitudinally along the beams 3230. The carriage 3100 may be mounted to the platform 3232 by a jacking arrangement 3900 configured to allow the carriage 3100 to be selectively moved upward or downward (i.e., toward or away from the surface of a pipe or pipe segments mounted to the support system 3200). As in the previous embodiment, the jacking arrangement 3900 can also be used to supply a desired welding force to feedstock applied to the surface or surfaces to be welded. The jacking arrangement 3900 may be or comprise a scissor jack, which may, in particular, be a bidirectional scissor jack like that described above and shown in FIGS. 21-23.

In the illustrated embodiment, the welding carriage 3100 and its mounting arrangement 3240 are positioned between the supports 3220. This positioning allows the material deposition and welding carriage 3100 to remain in place as pipe sections are rotatably placed in the support fixture 3200. It will be understood, however, that the carriage 3100 may alternatively be configured for positioning after the pipe sections 20, 30 are in place. In a particular example, the carriage 3100 may be configured to be positioned on top of the pipe section(s) and to be held in place by an additional structure (not shown).

Figure 29:
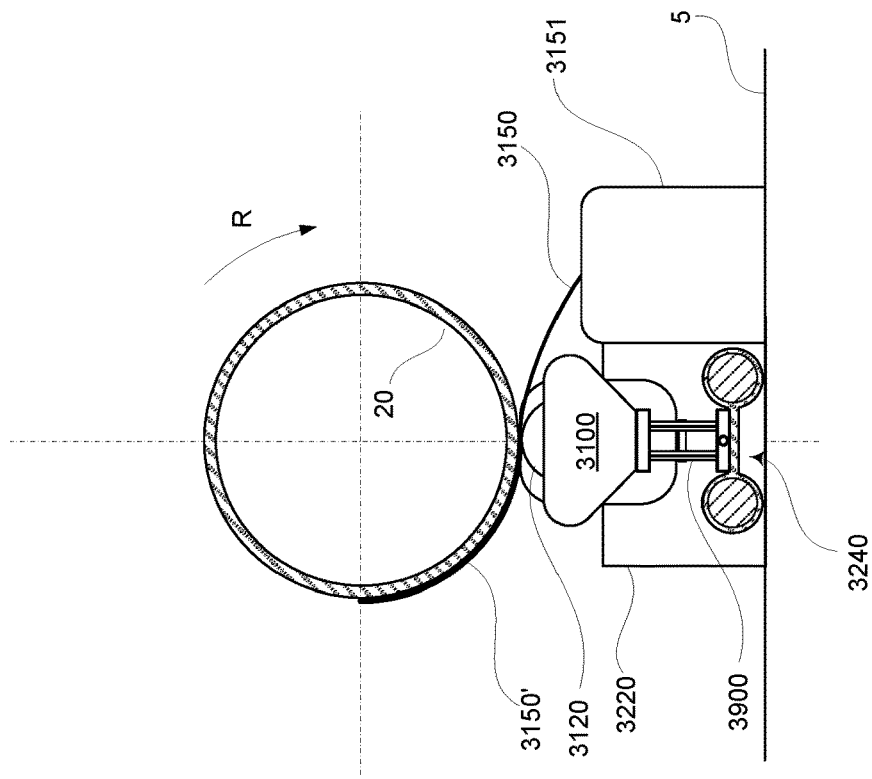
FIG. 29 is a cross-sectional view of a pipe section and a welding apparatus according to an embodiment of the invention.
Figure 28:
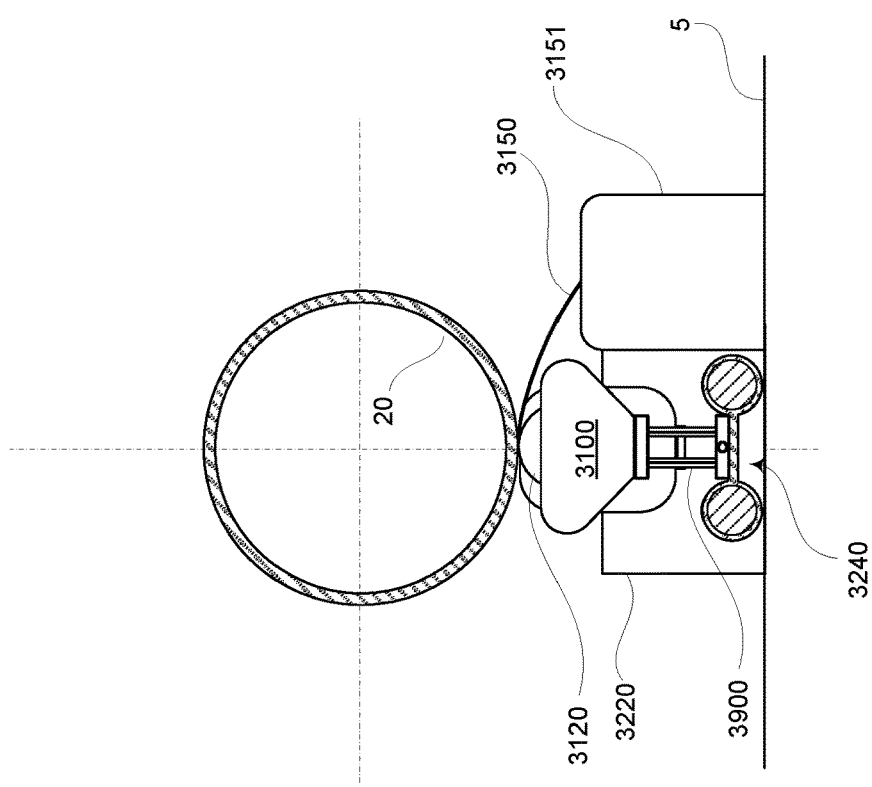
FIG. 28 is a cross-sectional view of a pipe section and a welding apparatus according to an embodiment of the invention.

The carriage 3100 is configured so that the housing 3110 and the weld head/sonotrode 3120 remain fixed while the pipe sections 20, 30 are rotated. This produces a relative motion between the sonotrode 3120 and the interface 40 that is substantially the same as in the previously described orbital embodiment. As the pipe sections 20, 30 rotate in rotation direction R, feedstock 3150 is drawn from the feedstock source 352 to pass between the sonotrode 3120 and the surfaces of the pipe sections 20, 30 to produce a deposited/welded layer of feedstock material 3150'. FIG. 28 shows the pipe sections 20, 30 at an initial position and FIG. 29 shows the pipe sections 20, 30 after they have made a quarter of one rotation in direction R. (The guide member 3300b is removed from FIGS. 28 and 29 for clarity.) The weld head 3120 is mounted so as to allow application of the welding force $F_W$ to the feedstock 3150 and the structure surface during rotation of the pipe sections 20, 30 (or a single pipe section). The welding force $F_W$ may be provided by the jacking arrangement 3900 or by other external electrical, mechanical or electromechanical mechanisms. In the illustrated embodiment, the weight of the pipe section(s) may contribute to the to the welding force $F_W$.

At the same time the welding force $W_F$ is being applied to the feedstock 3150, the sonotrode transducer 3120 is energized to produce high frequency vibration to weld the feedstock 3150 to the structure (in this case, to the surfaces of the two pipe sections 20, 30). In the illustrated example, the welded feedstock layer 3150' bridges the joint line 40 and serves as a first layer of an ultrasonic weld to permanently join the two pipe sections 20, 30. Upon completion of one rotation, the carriage 3100 will have applied a complete first layer of welded feedstock 3150'. The pipe sections 20, 30 may simply continue their rotation to begin forming a second layer of welded feedstock 3150'. The process may be repeated as many times as necessary to produce a desired weld without removal or shifting of the carriage 3100 or the pipe sections 20, 30.

If a complete circumferential weld layer is not required, the material deposition and welding carriage 3100 may be commanded to deposit and sonically weld a feedstock layer during only a portion of a rotation of a pipe section to target a particular circumferential area. Upon completion of deposition/welding of a layer over the target area, the rotation of the pipe section could be continued until the target area is again presented to the material deposition and welding carriage 3100, whereupon a second layer could be initiated over the target area, and so on until a desired weld is achieved.

In some applications, it may be desirable to produce an over-lapping weld to enlarge the joining area along or adjacent the joint line 40. In such applications, the pipe sections could be axially shifted after formation of an initial circumferential weld, and the process repeated to produce a second weld over-lapping the first.

As in the previous embodiment, the material deposition and welding carriage 3100 may also comprise an on-board data processor 360 in communication with the sonotrode transducer 3120 and feedstock dispensing mechanism. The processor 360 may also be in communication with external processors or user input devices. In some embodiments, this may be by wireless connection via a network. The processor 360 may also be in communication with an internal or external power source connected to the sonotrode transducer 3120. The apparatus 3120 may also include a sensor package (not shown) mounted to the carriage housing 3110. The sensor package may be in communication with a data processor and could include, for example, optical, laser, thermal or other sensors configured and positioned to capture data on the applied feedstock 3150'. The captured data may be analyzed to assess the integrity of the welded layer 3150'.

Aspects of the present invention can also be applied in planar repair or manufacturing processes. In an illustrative scenario shown in FIGS. 30-36, a thin plate 60 is to be welded to a large vertically oriented wall or base plate 50 along an interface line 40. For this application, a planar motion portable welding apparatus 4000 according to an embodiment of the invention may be used for in-situ welding. As schematically illustrated in FIGS. 30-36, the welding apparatus 4000 comprises a material deposition and welding carriage 4100 attached to and supported by a planar motion fixture 4700. The fixture 4700 is similar in concept and operation to an xy-plotter in that it allows controlled two dimensional movement of the carriage 4100 parallel to a generally planar surface to which the fixture 4700 is attached.

The fixture 4700 comprises a rectangular outer frame 4710 with two horizontal guide rails 4780 and two vertical guide rails 4790 and a support 4770 at each corner. The supports 4770 are configured for removable attachment to the planar wall 50. The supports may be attached using any mechanism sufficient to counter the forces applied to the wall 50 during a welding operation. Suitable mechanisms may include, without limitation, tack welding, reversible chemical or thermal bonding, hydraulics, mechanical fasteners (e.g., screws, bolts, clamps, etc.), and magnets. The fixture 4700 is configured for operably retaining a carriage support arrangement that comprises a horizontal (x axis) beam 4720 movably mounted to the vertical guide rails 4790 and a vertical (y axis) beam 4740 movably mounted to the guide horizontal guide rails 4780. The attachments of the beams 4720, 4740 to the guide rails 4780, 4790 are configured so that the beams can be moved in directions orthogonal to their respective longitudinal axes 4730, 4750. The beams 4720, 4740 may be formed from solid or tubular members or from channel stock. While in the illustrated embodiment, the beams 4720, 4740 have a rectangular cross-section, other polygonal or round (e.g., circular) cross-sections may be used.

The horizontal beam 4720 may be mounted to the vertical guide rails 4790 by a pair of guide rail followers 4792 configured to slide vertically along the guide rails 4790. Similarly, the vertical beam 4740 may be mounted to the horizontal guide rails 4780 by a pair of guide rail followers 4782. In some embodiments, the guide rail followers 4782, 4792 may be provided with an automated or manual drive mechanism configured to selectively translate the beams 4720, 4740 along their respective guide rails 4790, 4780. Some such embodiments may include a geared drive mechanism such as in the exemplary arrangement shown in FIGS. 33*a* and 33*b*. In this arrangement, the vertical guide rail 4790 is formed with a channel 4712 on its outward facing side. Within this channel is positioned a linear gear rack 4714. The guide rail follower 4792 is attached to the end of the horizontal beam 4720. A drive gear 4794 mounted to a gear shaft 4795 inside the follower 4792 is configured to operably engage the gear rack 4714 so that rotation of the drive gear 4794 causes the guide rail follower 4792 to move along the guide rail 4790. The gear shaft 4795 may extend out through the case of the guide rail follower 4792 so that it can be engaged by any form of rotational power mechanism (not shown). Alternatively, a manually rotatable wheel can be attached to the drive shaft 4795. It will be understood that such a drive gear mechanism may be provided for guide rail followers 4792 attached at the ends of the horizontal beam 4720. It will further be understood that a similar drive gear arrangement may be provided for one or both of the followers 4782 attached to the ends of the vertical beam 4740.

In embodiments, having powered drive mechanisms for the rail followers 4782, 4792, such drive mechanisms may be controlled by a wired or wireless motion control processor. The motion control processor may be configured to receive motion commands from a user and transmit them to the drive mechanisms to provide control over the translational motion of the horizontal and vertical beams 4782, 4792 and, thus, the path of the carriage 4100. The motion control processor may be configurable to provide a sequence of instructions to the first and second movement control mechanisms configured to cause the movement of the carriage 4100 along a predetermined two-dimensional path.

The material deposition and welding carriage 4100 may be substantially similar to that of the weld carriage 110 of FIGS. 1-3, but without the undercarriage. Similar to the weld carriage 110, the carriage 4100 has a carriage housing 4300 with a sonotrode 4200 and an arrangement 4520 for dispensing feedstock material 4500 and applying it to a target surface. In some embodiments, it may be beneficial to eliminate the housing 4300 and directly couple the sonotrode 4200 to the jacking arrangement 4900.

The material deposition and welding carriage 4100 is mounted to the planar motion fixture 4700 and a mounting arrangement 4240 that includes the horizontal and vertical beams 4720, 4740, a follower body 4400, and a jacking arrangement 4900. The follower body 4400 may be solid or hollow, but in either case is configured to slidably receive both the horizontal beam 4720 and the vertical beam 4740 so that the follower body 4400 can slide along either beam 4720, 4740 when the other beam 4720, 4740 is moved along its respective guide rails 4790, 4780. Accordingly, the mounting arrangement 4240 and the carriage 4100 are moved when the beams 4720, 4740 are moved along the guide rails 4780, 4790. When the horizontal beam 4730 moves, the carriage 4100 is moved in a direction parallel to the y-axis 4750 and when the vertical beam 4740 moves, the carriage 4100 is moved in a direction parallel to the x-axis 4730. In this way, the carriage 4100 may be moved along any path within a plane parallel to the wall 50. In some embodiments, one or more handles 4180 may be attached to the follower body 4400 to facilitate manual movement of the carriage 4100. As previously described, in some embodiments, movement of the carriage may be accomplished by mechanized movement of the beams 4720, 4740 along the guide rails 4780, 4790.

Figure 32:
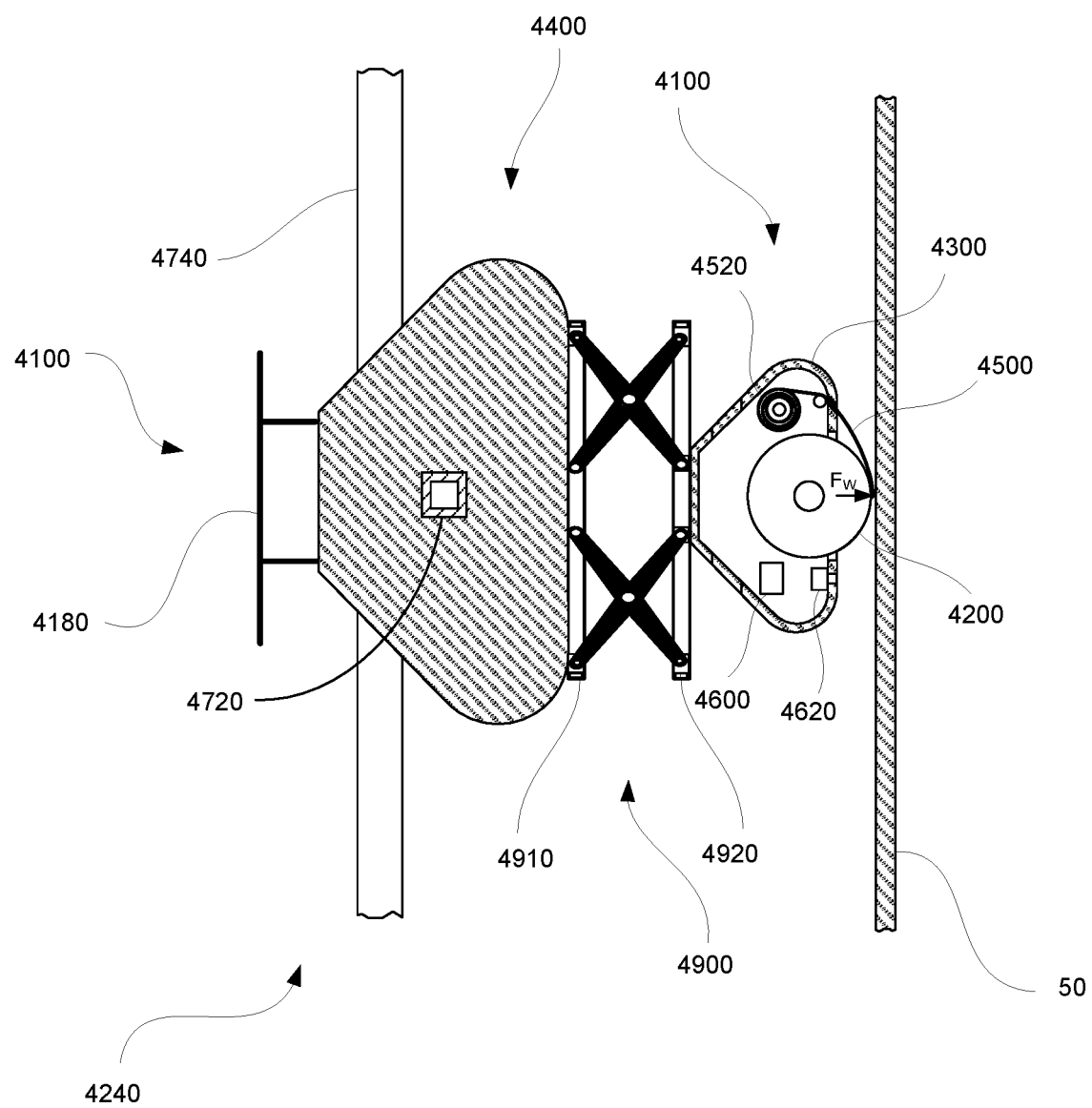
FIG. 32 is a section view of a portion of the welding apparatus and target of FIG. 31.
Figure 33A:
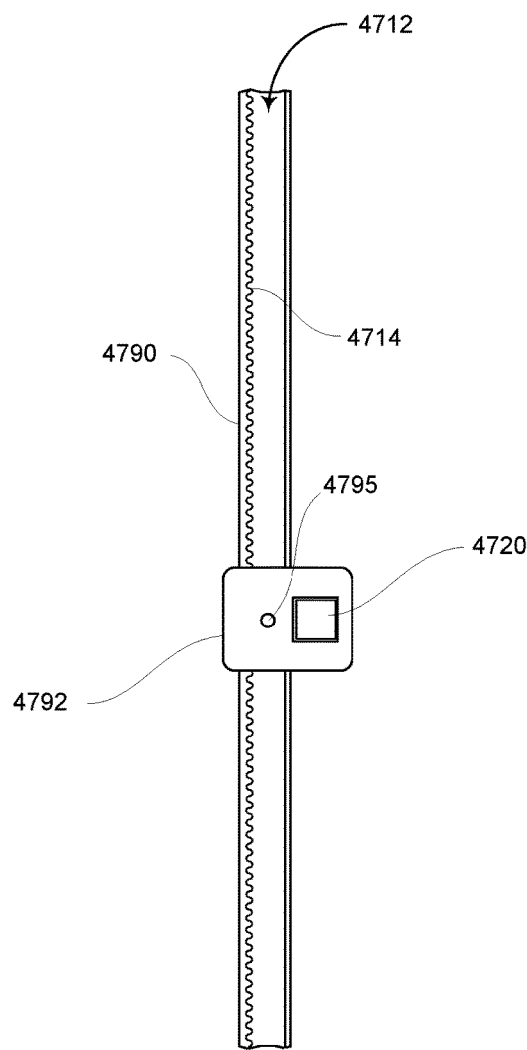
FIGS. 33a and 33b are views of a portion of a welding apparatus according to an embodiment of the invention.
Figure 33B:
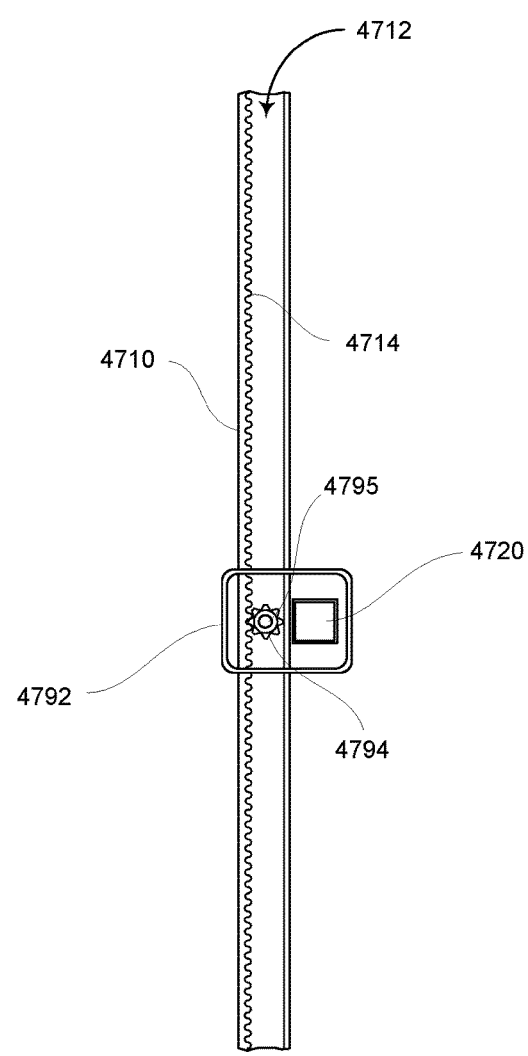

The carriage 4100 is attached to the follower body 4400 by the jacking arrangement 4900 so that the carriage 4100 may be extended or retracted along a z-axis 4110 orthogonal to the x-axis 4730 and the y-axis 4750 (i.e., toward or away from the target surface). The jacking arrangement 4900 may be substantially similar to those of the previously described embodiments. As best seen in FIG. 32, the base member 4910 of the jacking arrangement 4900 is attached to the follower body 4400 while the extendible and retractable load platform 4920 of the jacking arrangement 4900 is attached to the carriage housing 4300.

It will be understood that in some embodiments, the jacking arrangement 4900 may be replaced by a rigid structure tow which the carriage housing 4300 is attached. This structure may be sized and configured to place the sonotrode 4200 in close proximity to or in contact with the target surface. In other embodiments, the carriage housing 4300 may be attached directly to the follower body 4400.

The carriage 4100 is configured so that when the fixture 4700 is mounted to the wall 50, the sonotrode 4200 may be selectively brought near to or into contact with the surface of the wall 50 by extending the jacking mechanism 4900. While in contact, the sonotrode 4200 may slide along the surface as the carriage 4100 is moved along the horizontal and/or vertical beams 4720, 4740. In the embodiment and scenario illustrated in FIGS. 34-36, the carriage 4100 is mounted so that the feedstock 4500 can be laid along the interface line 40, which parallel to the vertical beam 4740. It will be understood that the apparatus can be mounted so as to lay and weld feedstock a long a line parallel to the horizontal beam 4720 as well. In some embodiments, the carriage 4100 may be configured to be rotatable so that remounting is not necessary and so that feedstock 4500 may be deposited and welded along any two dimensional path. Regardless of its path, as the carriage 4100 moves in a forward direction D, feedstock 4500 may be selectively drawn from the feedstock source 4520 to pass between the sonotrode 4200 and the surface of the structure(s) to be welded.

It will be understood that in some embodiments or applications, movement of the carriage 4100 is accomplished manually. In other embodiments, the motion of the carriage 4100 may be accomplished through powered drive mechanisms on board the rail followers 4782, 4792, which may, in turn, be either automated or manually controlled.

As in the previous embodiment, the material deposition and welding carriage 4100 may comprise an on-board data processor 4600 in communication with the sonotrode transducer and feedstock dispensing mechanism 4520. The processor 4600 may also be in communication with external processors or user input devices. In some embodiments, this may be by wireless connection via a network.

The processor 4600 may also be in communication with an internal or external power source connected to the sonotrode 4200. A sensor package 4620 may be mounted within the weld head carrier 4300. The sensor package 4620 may be in communication with the data processor 460 and could include, for example, optical, laser, thermal or other sensors configured and positioned to capture data on the applied feedstock 4500'. The captured data may be analyzed to assess the integrity of the welded layer 4500'.

Figure 34:
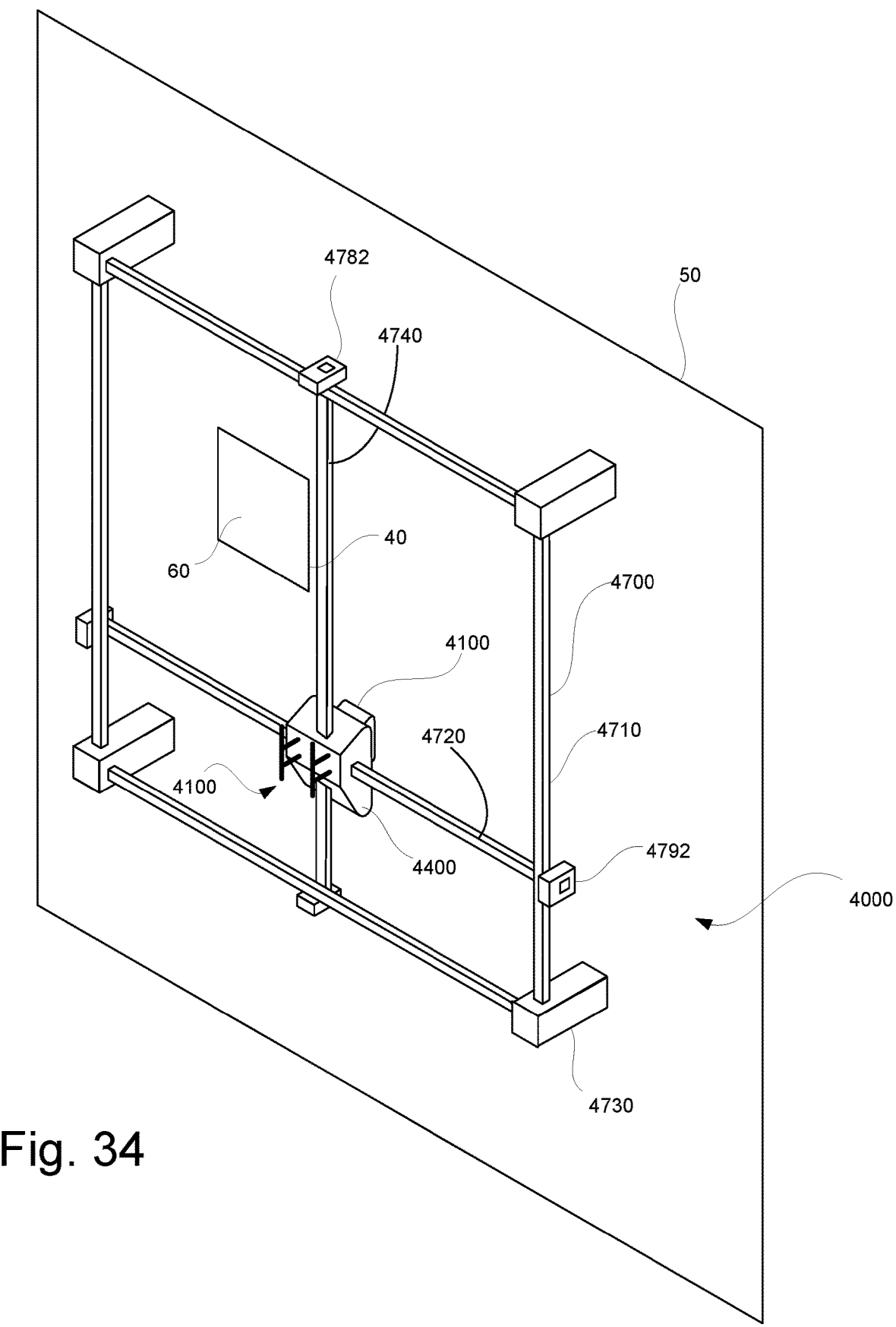
FIGS. 34-36 are perspective views illustrating a sequence of operation of a welding apparatus according to an embodiment of the invention.
Figure 35:
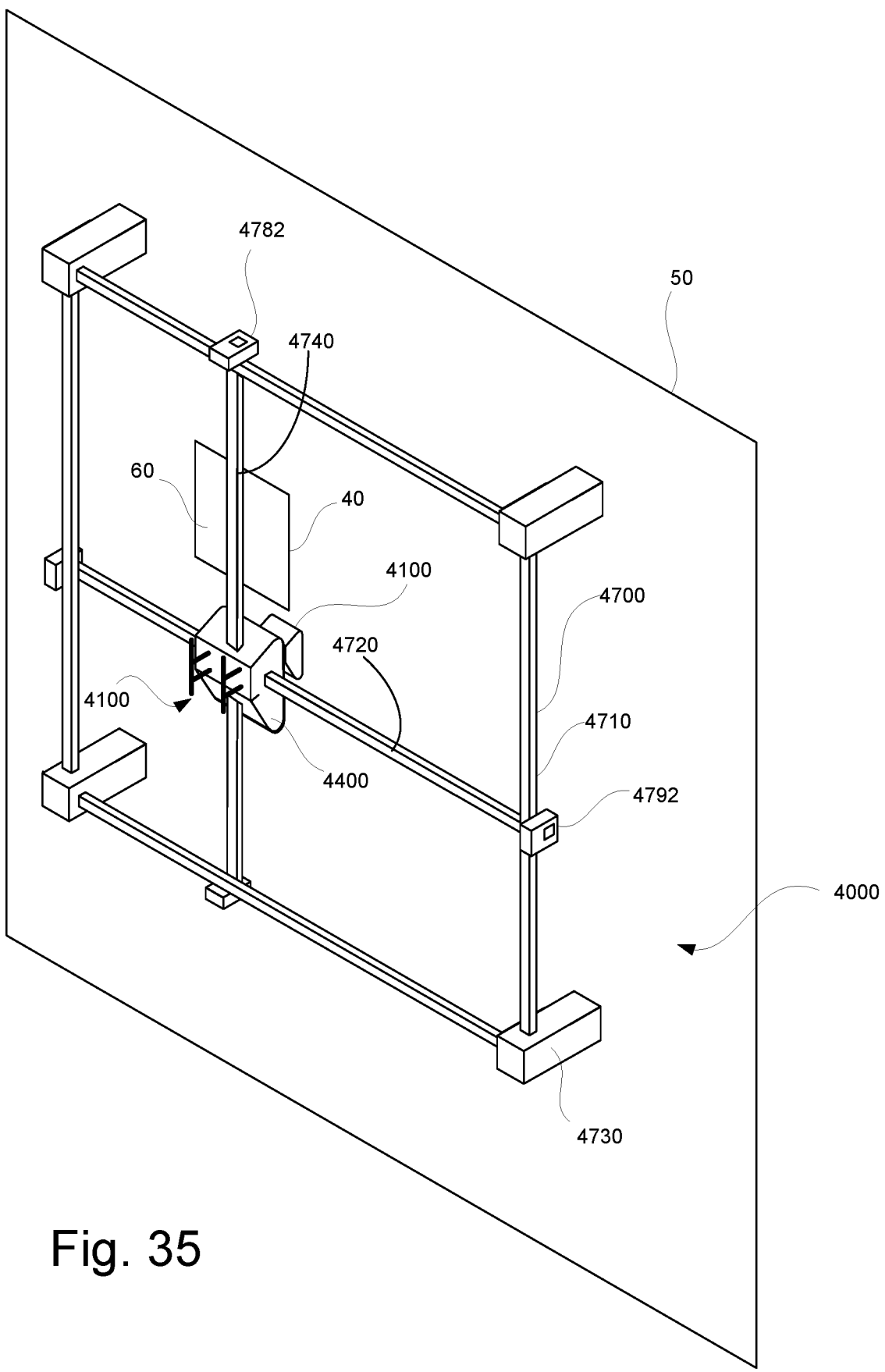
Figure 36:
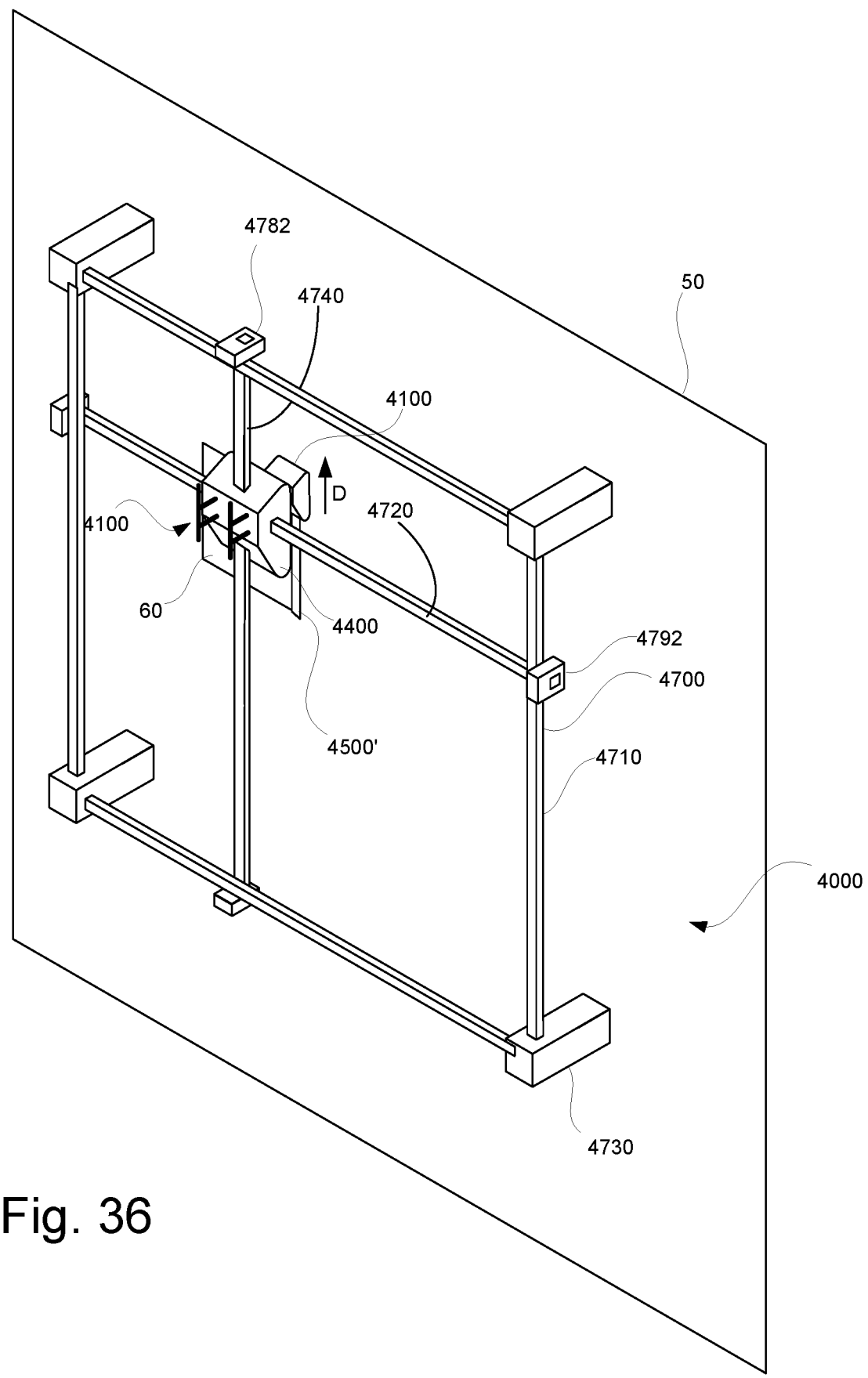

FIGS. 34-36 illustrate a sequence of operation for the welding apparatus 4000. In FIG. 34, the guide rails 4780, 4790 of the frame 4700 are mounted to the wall 50 so that the interface 40 to be welded is within the outer frame 4700. The carriage 4100 and beams 4720, 4740 are mounted to the guide rails 4780, 4790. As shown in FIG. 34, the carriage 4100 may initially be positioned away from the target area. FIG. 35 shows the carriage 4100 after movement in the horizontal and vertical directions to a position at one end of the interface 40 where welding is to be initiated. FIG. 35 also shows that the jacking mechanism 4900 has been extended to bring the sonotrode 4200 into contact with the surface 50. Starting from this position and configuration, a welding operation is conducted in which the carriage 4100 is moved over or along the interface line 40. As the carriage 4100 moves feedstock material 4500 is deposited on the target surface ahead of the sonotrode 4200. As the sonotrode 4200 engages the deposited feedstock material, the sonotrode 4200 applies a welding force $F_W$ is applied and ultrasonic vibrations are conducted into the feedstock material and the target surface along the Z-axis Z-axis 4110 thereby producing a welded feedstock material 4500'. FIG. 36 shows the carriage 4100 in a position partway along the interface 40, a layer of welded feedstock 4500' having been disposed over and welded to the plate 60 and the wall 50 on both sides of the traveled portion of the interface 40.

Upon completion of its path along the interface 40, the carriage 4100 will have applied a complete first layer of welded feedstock 450'. The carriage 4100 may then be returned to the position shown in FIG. 35 and the feedstock deposition and welding action repeated for another layer of feedstock 450' following the same carriage path. The process may be repeated as many times as necessary to produce a desired weld.

In some applications, it may be desirable to produce an over-lapping weld to enlarge the weld area. In such applications, after formation of an initial weld along a first carriage path, a second weld over-lapping the first may be formed by passing the carriage along a second path shifted slightly from the first.

In any of the foregoing embodiments, the material deposition and welding apparatus may include hardware for conducting a machining operation (i.e., a material removal or shaping action). In particular, CNC machining may be used prior to performing the deposition/welding operation (e.g., surface preparation) or following the deposition/welding operation (e.g., to remove material added via the process).

In the methods of the invention, the sonotrode frequency, speed, and force are parameters that may be controlled by either user input or feedback from a closed loop control system. An open-looped control system could also be utilized but may require additional manual operations to apply forces locally via mechanical means. Control parameters may be pre-programmed or changed during the deposition by closed loop control based on in situ measurements obtained from an array of sensors.

This system and method can integrate laser scanning in-situ for dimensional monitoring or deposition quality. In this proposed variant in-situ scanning could be used to scan the material in question as part of manual or closed loop controls to inform the deposition process and manually or automatically adjust the deposition of material. It is also understood that a system of integrated or individual sensors may be used for the deposition of the material using one or more of the following measurements:

1. Thermal measurement can be performed on the base material and applied material via thermal imaging or temperature readings for quality control.
2. Measurement of acoustic or other ultrasonic readings to enable the devices monitoring.
3. Visual dimensional measurements can be made to manually or automatically to adjust the application and may use a plurality of cameras, imaging hardware/software, infrared, or other suitable optical measurements for determining material position for both the base material and feedstock.
4. Integrated use of magneto-induction complex impedance analysis, eddy current, acoustic measurement, and/or other electro-magnetic properties may be integrated into this system to inspect, measure, or otherwise provide objective quality evidence of the material before, during, or after fabrication.
5. Part scanning for fabrication, path planning, and post inspection are considered integral variants of this method.

Application of the device can be performed manually or automatically with path planning or similar software for the automatic fabrication or repair of material or components. Path planning may be modified in-situ based on readings from one or more sensors monitoring the material deposition.

The systems and methods of the invention have many applications, including, but not limited to, the following: joining of materials, pipe, repair of pipe or pipe joints, repair of flat surfaces (e.g., bulkheads), and cladding of pre-shaped feedstock to flat surface or pipe. However, it should be understood that this method is not constrained to just those examples. Essentially any material (or even dissimilar metals) may be joined methods of the invention. If an ultrasonic bond can be made between the feedstock and the base structure/material, then it expected that this system and method can be applied.

It will be understood that the above method may incorporate diagnostic operations to assess the condition/characteristics of a weld after application of a weld layer. Information from these diagnostic operation may be used to make adjustments to the welding apparatus or operation.

It will be understood that the methods of the invention may be used in conjunction with any form of ultrasonic weld process using any suitable material. Further, it will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

What is claimed is:

1. A welding apparatus comprising:
a guide rail arrangement removably attachable to a welding target, the guide rail arrangement including
at least one guide rail having a lateral channel in which a gear rack is disposed, and
a plurality of supports attached to each of the at least one guide rail and removably attachable to a surface of the welding target, the supports being sized and configured for maintaining the at least one guide rail at a uniform distance from the surface;
a carriage mounting arrangement removably mountable to the guide rail arrangement, the carriage mounting arrangement comprising
for each guide rail of the at least one guide rail, a beam support mountable to said guide rail for slidable movement there-along,
a first drive mechanism attached to one of the beam supports, the first drive mechanism including a drive gear configured for engaging the gear rack of a target-mounted guide rail when said one of the beam supports is mounted to said target-mounted guide rail, whereby rotation of the drive gear causes said one of the beam supports to move along said target-mounted guide rail, and
a first elongate beam mounted to the beam support so that when the guide rail assembly is attached to the target surface and the beam support is mounted to its respective guide rail, the first elongate beam is parallel to the target surface or to a plane tangential to the target surface; and
a welding carriage comprising a carriage housing mounted to the first elongate beam and having an ultrasonic weld head disposed therein, the weld head comprising a sonotrode extending toward the target surface when the welding apparatus is in a welding configuration in which the guide rail arrangement is attached to the target surface and the carriage mounting arrangement is mounted to the guide rail arrangement, the sonotrode being operable to conduct ultrasonic vibrations into and through a layer of feedstock material deposited on the target surface to weld the feedstock material to the target surface.

2. A welding apparatus according to claim 1 further comprising a feedstock source disposed within the carriage housing and configured for selectively depositing a feedstock material on the target surface of the welding target when the welding apparatus is in the welding configuration.

3. A welding apparatus according to claim 1 wherein the welding target is a cylinder and each of the at least one guide rail forms a continuous circumferential ring around the welding target when the guide rail arrangement is attached to the welding target.

4. A welding apparatus according to claim 3 wherein the welding target is fixed in place and wherein when the welding apparatus is in the welding configuration, the first drive mechanism is operable to move the carriage mounting arrangement and the carriage along a circumferential path around the cylindrical welding target to apply and weld the feedstock material along a circumferential line on the target surface of the cylindrical welding target.

5. A welding apparatus according to claim 3 wherein the welding target is movable and wherein each beam support is fixedly attached to a support surface so that, when the welding apparatus is in the welding configuration, the first drive mechanism is operable to rotate the cylindrical welding target while the carriage mounting arrangement and the carriage remain stationary, the rotation of the cylindrical welding target allowing the carriage to deposit and weld feedstock material along a circumferential line on the target surface of the cylindrical welding target.

6. A welding apparatus according to claim 3 wherein the carriage housing is attached to an extension and retraction mechanism attached to the first elongate beam.

7. A welding apparatus according to claim 6 wherein the extension and retraction mechanism is a scissor jack.

8. A welding apparatus according to claim 6 wherein the extension and retraction mechanism is a bidirectional scissor jack.

9. A welding apparatus according to claim 1 wherein
the welding target comprises a substantially planar surface,
the guide rail arrangement further comprises first, second, third and fourth guide rails each having a lateral channel in which a gear rack is disposed,
the first and second guide rails are linear, spaced apart and parallel to an X-axis,
the third and fourth guide rails are spaced apart and parallel to a Y-axis orthogonal to the X-axis and are connected to the first and second guide rails to form a rectangular guide rail frame,
the carriage mounting arrangement comprises
a first beam support mountable to the first guide rail for slidable movement there-along and a second beam support mountable to the second guide rail for slidable movement there-along, the first elongate beam being mounted to the first and second beam supports and the first drive mechanism being attached to one of the first and second beam supports,
a third beam support mountable to the third guide rail for slidable movement there-along,
a fourth beam support mountable to the fourth guide rail for slidable movement there-along,
a second drive mechanism attached to one of the third and fourth beam supports, the second drive mechanism including a drive gear configured for engaging the gear rack of a target-mounted guide rail when the one of the third and fourth beam supports is mounted to said target-mounted guide rail, whereby rotation of the drive gear causes the one of the third and fourth beam supports to move along said target-mounted guide rail, and
a second elongate beam mounted to the third and fourth beam supports so that when the guide rail assembly is attached to the target surface and the third and fourth beam supports are mounted to the third and fourth guide rails, the second elongate beam is parallel to the target surface,
the welding carriage is mounted to the first and second elongate beams by a follower body slidably attached to the first and second elongate beams for slidable movement there-along, the welding carriage being disposed and attached to the follower body so that the sonotrode extends in a direction parallel to a Z-axis orthogonal to both the X-axis and the Y-axis.

10. A welding apparatus according to claim 9 wherein the welding carriage is attached to the follower body by an extension and retraction mechanism.

11. A welding apparatus according to claim 10 wherein the extension and retraction mechanism is a scissor jack.

12. A welding apparatus according to claim 10 wherein the extension and retraction mechanism is a bidirectional scissor jack.

13. A welding apparatus according to claim 9 wherein one of the plurality of supports is attached to the rectangular guide rail frame at each corner of the rectangular guide rail frame.

14. A welding apparatus according to claim 9 wherein each of the first and second drive mechanisms includes a rotational power source operatively connected to the drive gear for producing controlled rotation thereof and wherein the welding apparatus further comprises:

a movement control processor in communication with the rotational power sources of the first and second drive mechanisms for transmitting movement control instructions thereto.

15. A welding apparatus according to claim 14 wherein the movement control processor is configurable to provide a sequence of instructions to the first and second movement control mechanisms configured to cause the movement of the carriage along a predetermined two-dimensional path.

\* \* \* \* \*